United States Patent
Mintz

(12) United States Patent (10) Patent No.: US 6,542,808 B2
(45) Date of Patent: *Apr. 1, 2003

(54) METHOD AND SYSTEM FOR MAPPING TRAFFIC CONGESTION

(76) Inventor: Josef Mintz, Savion Street 14, 49542 Petach Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/998,061

(22) Filed: Nov. 30, 2001

(65) Prior Publication Data

US 2002/0082767 A1 Jun. 27, 2002

Related U.S. Application Data

(63) Continuation-in-part of application No. 09/945,257, filed on Aug. 31, 2001, which is a continuation of application No. PCT/US00/00239, filed on Jan. 6, 2000.
(60) Provisional application No. 60/250,229, filed on Nov. 30, 2000.

(30) Foreign Application Priority Data

Mar. 8, 1999 (IL) .................................................. 128879
Sep. 1, 1999 (IL) .................................................. 131700

(51) Int. Cl.[7] .................................................. G06G 7/76
(52) U.S. Cl. .................. 701/117; 701/118; 340/934
(58) Field of Search ................. 701/117, 118, 701/119, 23, 25; 340/907, 910, 915, 919, 934; 348/149, 61

(56) References Cited

U.S. PATENT DOCUMENTS

| | | | |
|---|---|---|---|
| 5,428,545 A | 6/1995 | Maegawa et al. | 364/444 |
| 5,532,702 A | 7/1996 | Mintz | 342/463 |
| 5,539,645 A | 7/1996 | Mandhyan et al. | 364/438 |
| 5,933,100 A | 8/1999 | Golding | 340/995 |

FOREIGN PATENT DOCUMENTS

| | | |
|---|---|---|
| JP | 9-145389 A | 6/1997 |
| JP | 11-160081 A | 6/1999 |

*Primary Examiner*—Yonel Beaulieu
(74) *Attorney, Agent, or Firm*—Norris Mclaughlin & Marcus, P.A.

(57) ABSTRACT

System and method for mapping parameters of a queue of a road congestion. Length of the road congestion, motion rate and average arrival rate to the road congestion may be used to determine an expected delay in traveling as well as trends, using special radio systems and also existing radio networks such as Public Land Mobile Networks (PLMN) and Private/Public Data Networks (PDN). The mapping is performed relative to a front end of a queue of a road congestion. The mapping system may construct snapshots of mapping samples received from a small percentage of pre-designated probes. The mapping samples are received in response to predefined broadcast control messages. The determination of the length of a road congestion may be based on a direct approach, in dynamic conditions that include variations in the arrival rate of vehicles to the road congestion and the departure rate of vehicles from the congestion over time.

13 Claims, 24 Drawing Sheets

Table 2

| Conditions in Mapped Road | | | Optimum | Approximated Errors | |
|---|---|---|---|---|---|
| Probes | Lanes | Vin/Vout/C | ReMaps | Max Ev 90% | Eav |
| 3% | 2 | 16/20 | 4 | 9.5 | 4.8 |
| 3% | 2 | 18/20 | 5 | 7.5 | 3.7 |
| 3% | 2 | 20/20 | 5 | 7.0 | 3.2 |
| 3% | 2 | 22/20 | 5 | 7.5 | 4 |
| 3% | 2 | 24/20 | 4 | 9.5 | 4.9 |
| 4% | 2 | 16/20 | 3 | 8.0 | 4.1 |
| 4% | 2 | 18/20 | 4 | 7.0 | 3.3 |
| 4% | 2 | 20/20 | 4 | 6.0 | 3 |
| 4% | 2 | 22/20 | 3 | 7.0 | 3.4 |
| 4% | 2 | 24/20 | 3 | 8.0 | 4.1 |

Probes: Percentage of vehicles in mapped area equipped with mapping transceivers ReMaps: Number of overlay maps that follow a first map to provide minimum mapping errors Lanes: Number of joined lanes in mapped road (i.e, have common traffic directions)

Vehicles: Number of vehicles in mapped road at the first map (this parameter has neglected effect)

Vin/Vout/C: Ratio between average arrival rate (Vin) to departure rate (Vout) per mapping cycle (C)

Max Ev 90%: Max expected error in mapping for 90% of cases (units of predetermined occupation lengths of vehicles)

Eav: Average expected error in mapping (units of predetermined occupation lengths of vehicles)

Approximated
  Error: Average between too long and too short errors found by simulation compared with the real average of road congestion.

Figure 18A

Table 1

| Conditions in Mapped Road | | | Optimum ReMaps | Approximated Errors | |
|---|---|---|---|---|---|
| Probes | Lanes | Vin/Vout/C | | Max Ev 90% | Eav |
| 3% | 2 | 6/10 | 6 | 7.5 | 3.8 |
| 3% | 2 | 8/10 | 7 | 6.0 | 2.9 |
| 3% | 2 | 10/10 | 7 | 5.4 | 2.9 |
| 3% | 2 | 12/10 | 6 | 6.5 | 3.2 |
| 3% | 2 | 14/10 | 5 | 7.5 | 3.9 |
| 4% | 2 | 6/10 | 5 | 6.0 | 3.2 |
| 4% | 2 | 8/10 | 5 | 5.0 | 2.6 |
| 4% | 2 | 10/10 | 6 | 4.0 | 2.4 |
| 4% | 2 | 12/10 | 5 | 5.0 | 2.7 |
| 4% | 2 | 14/10 | 4 | 6.5 | 3.2 |

Figure 18B

METHOD AND SYSTEM FOR MAPPING TRAFFIC CONGESTION

RELATED APPLICATIONS

The present application claims priority from U.S Provisional Application Ser. No. 60/250,229 entitled "Method and System for Mapping Traffic Congestion", filed on Nov. 30, 2000, the content of which is incorporated by reference. The present application also is a continuation-in- part of U.S. application Ser. No. 09/945,257, filed Aug. 31, 2001, which is a continuation of International Application No. PCT/IB00/00239, filed Mar. 8, 2000.

FIELD OF THE INVENTION

This invention relates generally to a method and system for mapping traffic congestion and in particular to a method for improving the accuracy of said mapping when a relatively small percentage of vehicles are used as traffic probes. In particular, this method provided also for using existing radio networks such as Public Land Mobile Networks (PLMN) and land mobile Private/Public Data Networks (PDN).

BACKGROUND OF THE INVENTION

Traffic congestion is an increasingly serious problem in cities.

One way to identify and map such congestion in real time (the first step to relieving it) is to identify and map the positions of vehicles that are stopped or moving slowly. Such systems are often referred to traffic control and car navigation in the field of Intelligent Transport Systems (ITS).

PCT publication WO 96/14586, published May 17, 1996, the disclosure of which is incorporated herein by reference, describes, inter alia, a system for mapping of vehicles in congestion.

In one embodiment described in the above publication, a central station broadcasts a call to the vehicles which requests tho se vehicles which are stopped or which have an average velocity below a given value to broadcast a signal indicative of their position. Such signals are broadcast in slots, each of which represent one bit (yes or no) which relates to a position. Preferably, only one logical slot (that may be represented by more than one actual slot) is used to define the related position. Such signals are then used to generate a map of those regions for which traffic is delayed or otherwise moving slowly.

Preferably, an additional call is sent to the vehicles requesting transmission of indication signals which locate the slow moving or delayed vehicles at a higher resolution than that of the first call. Further calls may be made to allow for transmission of additional information on the status of the vehicles and/or to provide further characterization of the delays.

FIG. 1 shows an initial map generated by such a method, wherein the area represented by a pixel (slot) may, for example, be of the order of 250 to 1000 meters square. In a preferred embodiment of the invention described, the system then determines, based, inter alia, on the extent of the various contiguous areas which shows positive responses, a smaller area or areas for further study. Preferably, the system broadcasts a further query requesting those vehicles within the smaller area that have at least a given delay (which may be the same as or different from that used in the first query) to broadcast in slots, each representing a position, using a finer resolution, for example, 100 to 250 meters square. Based on the responses to this query a second map such as that shown in FIG. 2 is generated. As can be seen from FIG. 2, various branches of a road network radiating from an intersection, designated as A–F in FIG. 2, can be identified. To improve the usefulness of the display, a background map, such as a road map, may be displayed underlying the displays of any of FIGS. 1, 2 or 4 (described infra).

In the event that additional information relating to the delay is desired, further queries can be made. For example, vehicles which are traveling toward the intersection can be requested to broadcast in a slot which corresponds to the slot they are in and to their velocity toward the intersection. This allows for generation of the graph shown in the lower portion of FIG. 3. Additional slots may be used for the acquisition of other information regarding the responding vehicles. Such information may also be graphed as shown in the upper portion of FIG. 3.

Alternatively or additionally, a map which shows the average velocity of the vehicles toward the intersection as a function of the position can be generated. Such a map is shown in FIG. 4. To acquire the information needed for generating such a map, a number of queries may be made, each requesting an indication from all vehicles within the area of interest having a given average velocity toward the intersection. The responding vehicles would broadcast their indication signals in slots corresponding to their position. In the map of FIG. 4, the velocity for a given pixel is determined, for example, as the average velocity of the reporting slots for that position. In a display of the map of FIG. 4, the velocity or delay toward the intersection can, for example, be displayed as a gray scale value or as a color, with for example red being the highest velocity or delay and blue being a minimum displayed velocity or delay.

FIG. 5 is a generalized block diagram for a system useful for performing the ITS function described above (and which is also useful for the method of the present invention). FIG. 5 shows a base station or control center 91 having a control center transmitter 79 which broadcasts queries and optionally other signals to vehicles on command from a control computer 80. A remote vehicle 85 (only one vehicle is shown for simplicity) receives the query at a vehicle receiver 84 and transmits commands to a microprocessor 86, based on the queries it receives from the control center.

Microprocessor 86 also receives information regarding the status of the vehicle from one or more information generators and sensors indicated by reference numeral 88. This information may be sent by the sensors on a regular basis or may be sent on command from the microprocessor.

Microprocessor 86 is then operative to command vehicle transmitter 90 to transmit indication signals (or if required, information bearing signals) in a suitable slot in accordance with the information received by microprocessor 86.

The indication (or other) signals are received by a control center receiver 92 and processed by receiver 92 and computer 80. While the operation and construction of the apparatus designated by reference numerals 82, 84, 86 and 90 is straightforward and needs no further explanation, the operation of receiver 92 is usefully expanded upon with reference to FIG. 6.

Generally speaking, the RF signals transmitted by the vehicle may be at any frequency slot. It is to be expected that there will a certain amount of frequency diversity caused by the imperfect accuracy and stability of the vehicle transmitters 90. The slots are wide enough to accommodate this diversity.

Furthermore, often the system utilizes very large numbers of vehicles. If too many of these vehicles (in some particular situation) transmit in the same slot, then the total power transmitted may exceed authorized ERP or dynamic range restrictions. To overcome this problem longer, lower power, pulses may be used for indication signals. Furthermore, if a single receiver is used for receiving signals for all of the slots, intermodulation effects may cause spurious signals to appear in slots for which no actual signals have been received.

These problems as well as near-end to far-end transmission problems are substantially solved by the system shown in FIG. 6 and by certain constraints placed on the system which are not shown in FIG. 6. The problems and constraints but are described in the above referenced PCT publication, which should be consulted for a more complete exposition of the method and apparatus shown in FIGS. 1–6.

FIG. 6 shows a receiver system corresponding generally to reference number 92 and to a portion of computer 80 of FIG. 5. While the system of FIG. 6 is suitable for the prior art ITS system of the PCT publication, it is also suitable for use with the ITS system of the present invention.

An antenna 94 (or an array of antennas) receives signals from a plurality of vehicles simultaneously and passes them to a receiver and (optionally) AGC 96. Receiver and AGC 96, which may be of conventional design, down converts the received signals from RF to IF frequencies. The threshold levels of the detection process may be dependent on the AGC process. Alternatively, the system is operated in a closed loop mode in which the power radiated by the vehicles is dependent on the power received by the base station.

The IF signal is digitized by an A/D system 98 and further down converted by a down converter 100 to base band. It should be understood that this receiver/down converter system does not demodulate the incoming signals, but only down converts the RF so that the same relative frequency differences of the signals is present at the output of converter 100 as in the incoming signals, except that the absolute frequency has been reduced to a low frequency from the RF frequency of the transmitted signal. At these lower frequencies digital systems can be used to analyze and detect the signals.

The low frequency band signals are fed to a series of correlation filters 102 (correlation-type receiver), each of which has a very narrow bandwidth which is related to the correlation time of the correlation filter. Preferably, the frequency bandwidths of adjacent receivers 102 overlap so that the entire bandwidth of each of the slots is covered by one set of receivers 102. The output of each of the receivers is compared to a threshold 104 to determine if a signal is present at the frequency of the respective receiver 102 and the outputs of all of threshold detectors for a given slot are OR gated (or the best signal is selected) to determine if any signal is present in the slot.

In an alternative preferred embodiment of the embodiment disclosed, the strongest output of the set of correlation receivers is chosen for comparison with a threshold, with or without post-detection integration.

Use of a plurality of overlapping narrow band receivers in this manner also reduces the extent of side lobes of the detection process outside the band of the slot. This allows for closer frequency spacing of the slots since interference between slots having adjacent frequencies is reduced.

One set of receivers 102, threshold detectors 104 and an OR gate is provided for each slot and is referred to herein as a slot detector unit. Slot detector units for all of the slots feed a data processor 108 which, together with computer 80 processes the data as described above. When large numbers of vehicles are used in the system and intermodulation becomes a problem (or if AGC is used, and low level signals are lost), it may be necessary to provide a plurality of front end portions of receiver 92 (the front end being defined as receiver 96, converter 98 and converter 100), where each front end receives signals from only a portion of the entire frequency band including one or many of the slots. The function of correlation receivers 102 may also be implemented, for example, using set of DFT's or an FFT (for CW signals), matched filters or other correlation receiver methods or other optimum receiver methods, depending on the transmitted signals. Other methods such as energy detectors (e.g., radiometers) with or without tracking may also be used, however, they will give less optimal results, because of practical limitations on input band-pass filter designs.

It should be understood that using a plurality of correlation receivers for the same slot may increase the false alarm probability and hence the threshold for positive detection may be adjusted to provide a desired low false alarm probability.

The system may also be provided with a display 110 for displaying the data, and with a user interface 112 which is used by an operator to control both the operation of the system. The user interface also preferably controls the display and the memory to allow for the operator to review the maps previously generated or to generate new displays based on information previously received.

This system works well. However, there is a need for improved accuracy of mapping and/or utilizing a relatively small percentage of participating vehicles.

SUMMARY OF THE INVENTION

The present invention provides a system and method for mapping parameters of traffic congestion, e.g., road congestion, relative to a focus. Mapping of the road congestion may include determination of an average length of the road congestion over a time interval, motion rate in the road congestion and arrival rate to the road congestion. These parameters, in turn, may be used to determine an expected delay in traveling throughout the road congestion as well as trends (i.e., changes with time) in the road congestion.

The mapping is performed relative to a mapping focus, typically the front end of a road congestion. The mapping focus is preferably identified using the system and method described in the above-mentioned PCT Publication WO 96/14586, or it may be identified using any other suitable method known in the art, for example, by simple polling of predesignated target vehicles. Alternatively, the mapping focus may be provided from an external source, for example, based on reports regarding a problematic intersection or suspect intersections that are to be continuously monitored.

In an embodiment of the present invention, the mapping system constructs snapshots of mapping samples received from a small percentage of predesignated probes, e.g., a small percentage of vehicles equipped with an appropriate receiver and transmitter. The mapping samples are preferably received in response to predefined broadcast queries sent from the mapping system. In an embodiment of the invention, the determination of the average length of a road congestion may be based on a direct approach, obviating the need to estimate discrete lengths of the road congestion, in dynamic conditions that may include variations in the arrival rate of vehicles to the road congestion and the departure rate of vehicles from the congestion over time.

In preferred embodiments of the invention, the average motion rate within the road congestion may be determined without the need to increase the bandwidth of the radio spectrum that is used by the probe vehicles. The determination of motion rate in addition to the length of the congestion enables to estimate the expected time delay for a vehicle that is about to enter the road congestion. The method of determining motion rate may isolate reporter vehicles, whereby of reporting may be utilized to improve the method of the invention, e.g., to increase the accuracy at which the length of the road congestion may be determined and/or to provide information about trends in the road congestion, i.e., expansion or contraction of the congestion. Such isolated mapping enables the system, for example, to concatenate non-overlapping segments in the mapping samples and, thereby, to estimate the average arrival rate to the congested road. This technique may be used in conjunction with an estimated departure rate to provide trends in the average length over time, whereby a preferred path chosen by a vehicle may be selected based on a current time delay as well as on the trend in the road congestion.

The concatenation of non-overlapping segments of mapping samples, in accordance with a preferred embodiment of the invention, may also be useful for estimating the percentage probe vehicles within the road congestion. Based on this estimation, in conjunction with a calculation of the estimated arrival rate and the estimated motion rate, the average length may be determined more accurately. This means that the number of mapping samples can be optimized to provide an accurate determination of the average length of the road congestion based on the parameters described above. Pre-stored data which may be generated by computer simulation of different road congestion conditions may be used in determining the optimum number of mapping samples for average length determination.

In accordance with the present invention, as described herein, concatenated mapping samples may be used to estimate the arrival rate and the percentage of probes. In traffic situations where two or more road congestions are correlated, several such concatenations from several different road congestion may be combined to improve parameter estimation. For example, to estimate the percentage of probes based on Maximum Likelihood estimator for Binomial distribution, the concatenation of more than one concatenated mapping samples from several correlated roads may be used by a statistical estimator. This can be used to improve estimates from short concatenated sample at an early stage of mapping a road congestion.

The motion rate within the road congestion, which may be detected based on two mapping samples, may also be used for determining a minimum required rate for taking snapshots of mapping samples according to a desired accuracy in determining the average congestion length. In embodiments of the present invention, the level of accuracy in determining average length based on motion rate may be estimated by computer simulation and provided as pre-stored data to determine an appropriate mapping sample rate. As mentioned above, motion rate can be detected by two mapping samples. At an initial stage of a mapping process, when the average arrival rate of vehicles to the road congestion and the probability of an arriving vehicle being a probe cannot be correctly calculated, prior statistical data may be used to initiate the estimation process. Refinement of these initial values may be performed during the sampling process by constructing concatenated segments of non-overlapping mapping sample segments and determining the average arrival rate as well as the percentage of probes, thereby enabling to determine the probability of an arriving vehicle being a probe. A similar approach may be used for determining the number of mapping samples according to the pre-stored data.

The pre-stored data may be based on computer simulation to provide minimum error in the determination of the average length or a modified average length. The modified average length may take into account predetermined parameters, e.g., giving more weight to later mapping samples than to earlier mapping samples or any other desired criteria that may result in a more accurate estimation process. As traffic condition are being mapped, statistical data is collected relating to average arrival rates and distribution of probe vehicles, whereby the system converges to realistic values at relatively early stages of the mapping, even before one would expect to have sufficient mapping samples to estimate these parameters.

In case of traffic light control, the sampling rate may be adjusted in accordance with the rate of change of the traffic lights, e.g., the timing of the green light activations. The timing of light changes may be provided by probe reports according to their reaction time to green light setting calibrated to distance from the traffic light. According to this embodiment, the times may be provided by a report from a probe which has been isolated for the purpose of motion rate estimation and other estimations, as described above. It should be noted that the average road congestion length may be determined with minimal error when the departure rate in each mapping sample is substantially equivalent to the average arrival rate.

When the average departure rate is not equal to the average arrival rate, the departure rate may be artificially adjusted to increase or decrease the length of the mapping samples, thereby to adapt the average departure rate to the average arrival rate. This may assist in determining the length of road congestion. Once the road congestion length is determined, based on the artificial adjustment, a readjustment stage may be applied to compensate for the artificial adjustment. The compensation may be based on a new weighted average which takes into account a trend in the length of road congestion. At any given time, the average length determination may be based on the latest mapping samples according to the number of mapping samples that will best determine the average length of the road congestion. Successive average length values may fed through an appropriate filter, as is know in the art, to remove large, random changes in value.

The present invention is comprised in a number of improvements on the prior art system which improve the position-related accuracy of the system.

As in the prior art system described above, preferred embodiments of the present invention may utilize the position related data transmission system of the above referenced PCT publication. In addition, the present invention may utilize the general structure of the transmitter and receiver as described in that publication and in the Background of the present invention. It should be noted that, because the present invention may utilize a communication platform and related technology similar to those described in the above mentioned publications, many features of the methods, devices and systems described in that publication are also applicable to the present invention.

According to some aspects of some preferred embodiments of the invention, mapping of congestion is based on identification of the starting point of traffic congestion and a determination of a distance of vehicles from a congestion start point or focus. The length of the congestion is estimated from the distance of the vehicle farthest from the congestion whose velocity is below a given velocity, preferably for some minimal time period.

Preferably, the vehicle positions are not determined for individual vehicles. Rather the vehicle report according to their positions, that correspond to a pre-determined sub-area, if they are stopped or if their velocity is below some value.

Preferably, vehicle positions over a time period are combined to form a congestion map.

Preferably, the positions that are combined are determined at the same position resolution. Alternatively, they do not.

According to an aspect of some preferred embodiment of the invention, the position of a vehicle is reported based on a distance to a known focus of a congestion.

In a preferred embodiment of the invention, the location of a potential congestion is determined by vehicles that are stopped or moving slowly reporting their positions at a low resolution, for example using a rectangular grid for two dimensional mapping. Once a potential congestion is identified, the position of the vehicles is reported based on their distance from a focus of congestion.

There is thus provided, in accordance with a preferred embodiment of the invention, a method of estimating the position, in an ITS system, of the length of congestion at a focus of a slowdown, the method comprising:

determining the positions of one or more vehicles farthest from the focus as a function of time; and estimating the length of the congestion based on the function.

Preferably, the position is estimated as the position of a vehicle farthest from the focus.

Preferably, the position is estimated as the position of a vehicle furthest from the focus during a given preceding time period.

There is further provided, in accordance with a preferred embodiment of the invention a method of improving the reliability of an ITS system, comprising:

determining the position of a plurality of vehicles;

determining an indication of a traffic stoppage if more than one vehicle is stopped along line of vehicles.

Throughout this disclosure, where applicable, the terms and phrases listed below may be defined as follows:

Mapping Focus

A position in a mapped road that defines the front end of the mapping range towards traffic moves usually refers to the front end of a road congestion.

Probe

A vehicle equipped with a transmitter connected to a computer both comprising an intelligent transmitter wherein the computer is provided with timing and positioning peripherals that according to a predetermined procedure can identify congested conditions and motion cycles parameters in a congested road, preferably equipped also with a receiver that enables a mapping system to control the activity of the reports preferably including levels of congestion to be experienced by the probe fore a report, resolution of position report, actual report time of a characteristic value of its position, disabling transmission of probes that are closer than a certain position to the mapping focus and re-enabling the transmission, and according to a predetermined protocol reports will preferably include, but not limited to, one or more of the following: arrival time to a congested road preferably in a short form such as elapsed time within a mapping cycle, indication on out of mapping range, time related to passing a position such as mapping focus, expected time of green light turn on when a road controlled by traffic light based on predetermined estimate for the delay in response of vehicle to departure according to its position in a waiting line preferably in a short form such as elapsed time within a cycle such as cycle of mapping samples or cycle of traffic light control (several of such different reports can be averaged by the mapping system); reports will preferably use a method of transmission that reports characteristic values by transmitting a signal in slot that best represents its characteristic value.

Characteristic Value of Position

A value that a probe provides according to a predetermined protocol regarding its position, or an indication on its position, such as its distance from a mapping focus along a road or otherwise along a path determined by the protocol.

Mapping System

A system comprising a receiver that receives reports from probes and a computer that constructs mapping samples from received reports and processes the mapping samples to provide characteristics of the road congestion including, but not limited to, one or more of the following reports: departure length from the road congestion between mapping samples and preferably its varying characteristics; arrival length to the congested road between mapping samples and preferably its varying characteristics; estimated length of road congestion; estimated average waiting time in a congested road; trend in the length of the congested road; estimated length of a congested road at a certain time and possibly interpreted values of length in a congested road to number of vehicles based on expected average occupation length of a vehicle such as in a stoppage.

The system will preferably be equipped also with a transmitter that according to a predetermined protocol controls the transmission of probes preferably including, but not limited to, one or more of the following: required criteria of traffic conditions that enables a report; resolution of reports; and preferably the time of the transmission of a characteristic value of a position that relates to earlier time than the transmitted time, disabling transmission of probes that are closer than a certain position to the mapping focus and re-enabling the transmission.

The system will preferably allocate slots to the probes that according to a predetermined protocol slots divide a range of positions or time interval to smaller segments so that each range will be represented by a different slot.

Mapping Sample

One or more time correlated characteristic values of position usually relates to time constraints that provide a snapshot of probe positions in a congested road.

Range Characteristic Value

A value that represents one or more characteristic values such as positions within a range of reports in a mapping sample. Range characteristic values can provide an average of positions or average distance from the mapping focus or a weighting average that consider parameters that affect inaccuracy in reports. Range characteristic value can also average several reported values about a common estimate made by probes, for example, estimate of green light time setting reported by more than one probe in a waiting line according to distance form the traffic light and reaction time to the traffic light. Such reports can use differential updates referred to a common time reference.

Occupation Length of Vehicle

Average segment along a road equivalent to the length between front of one vehicle in front or behind of it.

Mapping Range

A range respective with the mapped part of the road usually covers the congestion starting from the mapping focus.

Using the above terminology, in according with preferred embodiments of the invention, there is thus provided a method of estimating the length of a road congestion, based on probe vehicles reporting characteristic values of their position to a receiver of a mapping system which processes the reports, the method including:

(a) constructing a predetermined number of mapping samples, (b) determining in each mapping sample a position that relates to the position of a probe relatively far from a mapping focus, preferably a position close to the farthest probe position; and (c) selecting from the positions determined in step (b) the position which is the farthest from the mapping focus, thereby to determine an indication of the length of the road congestion.

In a preferred embodiment, the position determined in step (b) is the position of the farthest probe from the mapping focus.

According to an embodiment of the invention, after construction of a mapping sample a response is transmitted to the reporters that disables transmitters that did not transmit a report within a pre-selected range in the constructed mapping sample, to prevent the disabled transmitters from continuing to report. The selected range may include the position of the farthest probe.

Additionally, in accordance with preferred embodiments of the invention, there is provided a method of determining traffic motion and length of road congestion, in a system wherein probes, in response to a predetermined protocol, report characteristic values of their position to a receiver of the mapping system which processes the reports, the method including:

(a) constructing a mapping sample that includes at least one of said reports, (b) selecting a range of said position characteristic values in which the farthest reporter from a mapping focus is identified in a mapping sample constructed in (a), (c) transmitting to reporters a response that according to a predetermined procedure disables transmitters that did not transmit a report within the selected range from continuing to report, (d) receiving further reports and constructing a subsequent mapping sample, (e) repeating steps (a) to (d) according to a predetermined procedure, (f) selecting from the ranges selected in step (b) the farthest selected range to be indicative of the length of the road congestion; and (g) determining motion length toward a mapping focus by calculating a range characteristic value for a range in a mapping sample, subsequent to the first mapping sample, which includes the position characteristic value indicative of the closest position to the mapping focus and calculating the difference between the said range characteristic value and the range characteristic value of a corresponding selected range in an earlier mapping sample.

In an embodiment of the present invention, the range selected in step (b) is substantially the characteristic value of position of the farthest probe.

In an embodiment of the present invention, the indication of the length of the road congestion is determined substantially based on the farthest selected position in the constructed mapping samples.

In an embodiment of the present invention, the resolution of the position reports acquired from the probes is determined according to an occupation length of vehicle in a congested road in different traffic conditions.

In an embodiment of the present invention, at least two different reports from at least one probe are required to determine length of road congestion.

In an embodiment of the present invention, the number of mapping samples is 3 to 6 for expected average percentage of probes in the range of 3 to 5 percent and wherein the time interval.

In an embodiment of the present invention, the number of mapping samples is determined based on pre-stored data relating to an average motion over time period, estimated probability of probe arrival, and estimated arrival rate of vehicles. In some embodiments of the invention, the mapping system estimates the probability of probe arrival according to a predetermined procedure based on the percentage of probes among vehicles arriving at the congestion, and the method may further include:

concatenating a plurality of non-overlapping segments of consecutive mapping samples according to motion between mapping samples, determining the number of vehicles in the concatenated segments by the ratio of the length of the concatenated segments to expected occupation length of vehicles in the road congestion, and determining by a statistical estimator the percentage of probes based on the distribution of the accumulated probes identified over the period relevant to mapping samples of concatenated segments.

In an embodiment of the present invention, the statistical estimator is chosen according to assumed Binomial distribution of probes in the concatenated mapping samples.

In an embodiment of the present invention, the number of concatenated mapping samples is substantially limited to elapsed time interval wherein the expected probability of probe arrival to the road congestion is stationary.

In an embodiment of the present invention, the pre-stored data is optimized to provide the number of mapping samples to produce substantially the minimum expected error in the determined indication of the length of the congestion compared to the real average length of the congestion according to the respective mapping samples.

In an embodiment of the present invention, the optimization criterion is the minimum difference between the cumulative distribution function of errors that indicates that the estimates are too long and the cumulative distribution function that indicates that the estimates are too short.

In an embodiment of the present invention, the pre-stored data is prepared based on a simulation that shows the number of mapping samples required to provide minimum expected error for various conditions of congestion including motion rate, arrival rate and percentage of probes.

In an embodiment of the present invention, at a time prior to determining the indication on the length of the road congestion, mapping samples are adjusted according to a predetermined procedure that virtually adjusts the position of the mapping focus in the mapping samples in order to remove differences between motion rate and average arrival rate.

In an embodiment of the present invention, at a time after determining indication of the length of the road congestion, the determined indication is adjusted by a value which is indicative of the prior adjustments that were made to the mapping samples in order to remove the effect of prior adjustments on the mapping samples.

In an embodiment of the present invention, successive new indications of the length of the road congestion are determined according to a procedure that include successive newest mapping samples.

In an embodiment of the present invention, a one-dimensional median filter is applied to the successive indications on length of road congestion.

In an embodiment of the present invention, time correlated mapping samples are collected according to a required resolution of the road congestion length determination, based on departure rate of vehicles from the road congestion.

In an embodiment of the present invention, the number of vehicles in a lane segment of the road congestion is determined according to estimated occupation length of vehicles.

In an embodiment of the present invention, the number of vehicles in a lane segment of road congestion is determined according to the estimated occupation length of vehicles.

Further, in accordance with a preferred embodiment of the present invention, there is provided a method of creating conditions which enable assessment of traffic motion rate toward a mapping focus in a congested road and of the road congestion length at a certain time, wherein according to a predetermined protocol probes report characteristic values of their position to a receiver of a mapping system which processes the reports, the method including:

(a) constructing a first mapping sample that includes at least one of said reports, (b) determining a range of said position characteristic values in which at least one of said reports was identified in the first mapping sample, and (c) transmitting to reporters a response that according to a predetermined procedure disables transmitters that did not transmit a report within the selected range of the first mapping sample from continuing to report.

In an embodiment of the present invention, the characteristic value of a position is an indication of the distance of a reporter from the mapping focus.

In an embodiment of the present invention, the mapping sample constructed by reports is transmitted to the mapping system within a response time synchronized to the mapping system and to the reporters.

In an embodiment of the present invention, a report of a position characteristic value is a signal transmitted by at least one probe in a slot of the response time that is indicative on a range of positions.

In an embodiment of the present invention, the time of the position-related reports is determined by a broadcast query to the probes.

In an embodiment of the present invention, the selected range in which reporters are not disabled includes the position of the farthest reporter from the mapping focus.

In an embodiment of the present invention, the transmitted response to disable transmitters is a message including mapping sample that according to predetermined procedure reporters disable their transmitters from continuing to report if they had not transmitted a report within a range in the mapping sample selected according to the predetermined procedure.

In an embodiment of the present invention, after disabling a transmitter, the probe enables its transmitter by predetermined procedure at a time after it passes the mapping focus.

In an embodiment of the present invention, a non-disabled reporter reports a time indication representing its arrival at the reported position.

In an embodiment of the present invention, the time indication report is a signal transmitted by reporter in a slot that is indicative of a time interval in the mapping sample time constraints.

In an embodiment of the present invention, after a disabling response the mapping system receives the new reports and constructs a second mapping sample including new reports.

In an embodiment of the present invention, a reporter from the selected range reports an indication that it is out of mapping range if it passed the mapping focus at a time prior to time constraints of the second mapping sample. Preferably, in an embodiment of the present invention, the indication of out of mapping range determines no change in motion rate.

In an embodiment of the present invention, the indication of out of mapping range is a signal transmitted in a slot that a transmission in it is indicative on such condition.

In an embodiment of the present invention, the mapping system determines length of motion toward mapping focus by calculating a range characteristic value for a range in a mapping sample subsequent to a disabling response, which includes the position characteristic value indicative of the closest position to the mapping focus and calculating the difference between the range characteristic value and the range characteristic value of the corresponding selected range in an earlier mapping sample.

In an embodiment of the present invention, the mapping system determines the departure rate from the mapping focus in a congested road in units of length of a congested road segment per unit of time according to the determined length of motion towards mapping focus.

In an embodiment of the present invention, according to motion towards mapping focus, the mapping system determines a non-occupied space expected between vehicles along the road congestion.

In an embodiment of the present invention, the determined motion length towards the mapping focus related to average occupation length of a vehicle, including its unoccupied space, determines departure rate of vehicle from the congested road.

In an embodiment of the present invention, the time at which the traffic light system changes to a green setting is substantially identified by the mapping system through reports from probes.

In an embodiment of the present invention, according to predetermined procedure, a probe reports to the mapping system a substantial time when the traffic light system changes to the green setting by a predetermined delay taken for a vehicle to react according to its position in a waiting line.

In an embodiment of the present invention, the time of light change is substantially identified based on signal transmitted in a slot representing a time interval that best characterizes the time report.

In some preferred embodiments of the present invention, according to a predetermined procedure, the mapping system estimates arrival rate to the congestion, and the method further includes:

concatenating a plurality of non-overlapping segments of consecutive mapping samples according to the two said position related reports, determining time intervals between two time of arrival reports corresponding to two position related reports, determining average arrival rate in terms of segment length occupied by arriving vehicles between successive mapping samples by calculating the ratio of the total length of concatenated segment, in relation to the number of concatenated mapping samples.

In an embodiment of the present invention, the number of concatenated mapping samples is substantially limited to elapsed time interval in which the average arrival rate of probes to the road congestion is expected to be stationary.

In an embodiment of the present invention, the length of motion of non-disabled reporter towards mapping focus between two consecutive mapping samples determines the point between consecutive concatenated segments.

In addition to the system described above, the System and methods for identifying congested roads and gathering mapping samples for the implementation of the method of this invention, to determine parameters of vehicle queues, especially average queue length over time period, with priority for congested roads, existing radio networks such as Public Land Mobile Networks (PLMN) and land mobile Private/Public Data Networks (PDN) may also be used.

Examples of PLMN are GSM, IS-54, IS-136,PDC, PCS-1900, IS-95, GPRS and EDGE for GSM, WCDMA, and cdma2000 and others. Examples of PDN are Mobitex, CDPD and others. Other networks could also be included under these categories since the mapping of road congestion characteristically relate to very low velocities, and hence PHS, DECT and other similar networks could also be used.

The method suggested by the above-described invention is most valuable to estimate length and other parameters of varying queues, over time periods. The implementation of the method requires a gathering process that includes the following three stages, a) to identify a congested road, b) to determine the departure position of a queue, which in turn determines a mapping focus, and c) to construct mapping samples. The mapping samples are used to determine the parameters of a varying queue. Although in the description of the method for estimating queue parameters according to the mapping samples just one implementation possibility was elaborated in detail, the gathering part of the method is not limited to the elaborated possibility only, and in this context other methods such as polling and Aloha are mentioned. The elaborated implementation possibility has the advantage of providing rapid search and mapping that enables gradual control on the resolutions of the mapping. However this gathering method is also quite unique in the way it uses pre-designated communication slots to provide information. When plurality of transmitters use the same slot at the same time, instead of rejecting a transmission that usually caused data to be undetectable, the detected energy in such slots designates some predetermined information with to allocated slots which enables collided transmission to be valid (meaningful).

Communication methods such as used with PLMN and PDN do not consider the energy detection by itself as valid data transmission. Thus to implement the method suggested in the above described invention, in the case that such networks are considered for the gathering process, modification should be considered either to the PLMN or the PDN or to the gathering process. In the case when using such networks, as with the case of the elaborated method, the gathering process would include three stages of implementation as are used with the system suggested above. The first stage deals with the identification of congested road, preferably based on a search process that uses queries and position related responses related to a road map. The second stage of determination of a mapping focus is based on the assumption that a mapping focus could be assessed by the mapping system according to junctions in a road map and motion direction of identified slow down towards a junction and/or position of stoppage irregularities, related to a probe position in a road and/or related reports from probes. Such a process would preferably consider the intersection next to the travel position, according to motion direction, to be the departure position from the queue and hence the determination of a mapping focus is enabled. The mapping focus helps to determine one end of the road that could further be mapped by mapping samples. In the third stage mapping samples are constructed.

As mentioned above, when networks such as PLMN or PDN are considered for the implementation of the gathering process there are two options of approach that can be taken. One option is to make some modification to the networks. It is known that modulated messages transmitted simultaneously on the same radio spectrum resources are not interpreted as valid data in PLMN or PDN without sufficient allocation of radio spectrum and transmission time resources, or spectrum for respective spreading code techniques, in order to enable to distinguish between the messages, except for occasional situation when capture effect makes the reception to be valid. Thus in order to be able to accept such simultaneous transmission (which may be expected with the method of using pre-assigned slots for the mapping process) as valid information, without special allocation of radio spectrum resources, when using traditional networks, there is a need to modify these networks. Such modification could be implemented in different ways. For example, the used channel could, at some predetermined times, be modified so that according to a protocol of the network it would be allocated and would be used by the dedicated mapping system, or by a further modification of the detection process in the network it would be enabled to consider the carrier detection as valid information at such times that the channel would be used for gathering process (as further described in FIG. 19). In the latter case one preferred way to implement the communication is to use received signal integrated over time and to compare it to a threshold, to determine if there was a response by probes or not. When TDMA is used with the access to the channel, the slots of this channel can be used for signals transmitted by the probes. For example, a traffic channel on a physical channel used with CCCH in GSM-PLMN (using the same carrier-physical channel) used also for RACH (Random Access Channel) could be allocated in certain predetermined times. Another example could consider a random access channel that enables an access approach, for example, such as Aloha or DSMA, to be used at certain times for the gathering process. Such channels are designed to enable random access of mobile transmitters while considering co-channel interference, e.g., non slotted random access methods such as Aloha and DSMA or slotted access versions of Aloha with or without reservation method. Non slotted random access enabled carrier is less suited than slotted enabled ones to the implementation of the gathering process since with the process suggested as described above, there is a need to synchronize the communication to slots and hence there is a need for further modifications to make it work. When the access to network access channels are controlled by busy indication bits, such as used with DSMA, implemented with CDPD and NA-TDMA, such indication could be used at certain predetermined times to allocate time for the gathering process or to allocate a logical channel. With GSM, for example, a logical channel such as TCH could be allocated for this purpose. Pre-allocated times are required for the access of probes. This would require prior information to be provided to the probes, by control messages that would inform the probes about access timing to the PLMN/

PDN. Physical channels that are not designed to enable random access from mobiles are not recommended for this purpose. However, if a channel, not designed to be used for random access transmission is considered for the gathering process, there is a need pay attention to the maximum co-channel interference that could affect other cells, as it is a-priori considered with random access channels. A traffic channel is used for single source data or voice transmission. To use such channels for the gathering process, longer pulses and other methods can be used to improve the detection probability while minimizing transmission power.

A second, alternative, option to implementing the gathering process through PLMN and PDN networks, which does not require modifications to the PLMN/PDN networks, can be considered by giving up on some of the capabilities provided with a system described above. The feature that would be given up provides the rapid search for traffic jams according to the size of congestion together with the ability to make gradual control on the resolution of the mapping. By giving up this feature it would become feasible to use networks such as PLMN and PDN for the gathering process without the need to make modifications to the network, as described in the following. Further give up cost when using this approach will be the need to make some adaptations to the gathering process while considering varying delays in transmission of data from probes to the mapping processor. The logic of the suggested method described above will also hold with this modification. However, since frames/packets of data are used with the transmission in PLMN and PDN of implementation of the second option, predetermined resolution in the data would preferably be considered with the probe updates to the mapping processor. Such messages would be transmitted to the mapping processor through the PLMN and PDN as data that informs about e.g., the position of the sensed traffic required according to predetermined threshold of traffic, rather than transmitting indication in a position related slot. This could be implemented by using global coordinates such as can be achieved with GPS receiver or with road related position when data such as provided with car navigation system is used with each probe. To reduce the load on the network, dynamic threshold conditions would preferably be broadcast to the probes to screen out non required updates about low level of slow downs, as suggested with the queries above. Dynamic thresholds could be set in relation to selective areas and to different levels of traffic to provide more control on the update load according to affordable load on the PLMN and PDN at different times. According to traffic thresholds the probes can use, at any time, medium access channels of PLMN and PDN to initiate updates related to slow downs or stoppages. An update message would preferably include a position to identify the congested road and preferably travel direction and motion rates. In case that an update indicates that most likely a queue should be considered, a first mapping focus, such as expected departure position of the queue, which would be common to probe updates for a mapping sample, could then be estimated by the mapping system. Further to focus determination the mapping system can use broadcast channel to transmit mapping queries to construct mapping samples required by the method described in order to determine parameters of the queue according to mapping samples. The segment of road that corresponds to a mapping sample could be determined with the help of the focus determination for one end of the road segment. The other end of the segment could arbitrarily be determined and possibly consider prestored statistical data of the traffic in the mapped segment. Such segmentation would be necessary to distinguish between different segments, sometimes even in the same road, that would preferably have different mapping timing. Thus segments would preferably be used for determining respective common timing for position reports transmitted by probes for the same mapping sample. Thus mapping samples correspond to segments of road determined by the mapping system according to related characteristics of the mapped road. Mapping sample could be constructed by using, for example, broadcast channel by the mapping system to determine, by control message to the probes, a road segment for mapping samples and sampling time as a first stage. Then, the probes may use a network access channel in order to send to the mapping system their position or their position update in the mapping sample or, if preferred, related position to the mapping focus, according to predetermined procedure. It should be noted that with the approach of this option, the mapping focus is not crucial to be provided to the probes before enabling the gathering process of a mapping sample, so that communication load could be reduced. With this approach, the information provided as data frame/data packets by the probes to the mapping processor has relatively high overhead which makes some additional bits in a message to have small affect (in percentage) on the communication load. In such case the mapping segment and timing of sampling could be provided by the mapping system to the probes to trigger construction of mapping samples and the probes can use position related reports, which would be longer than messages that provide just distance report from a mapping focus. The position related data could just relate to global positioning of the probe or e.g., to a road map related position used with a car navigation system, and the mapping focus would actually be considered by the mapping processor only. The medium access of PLMN/PDN is used asynchronously by many different probes. When probe updates to a mapping sample are considered, there is a need to overcome non correspondence between sequential order of reception times of probe updates and sequential order of probe positions within a mapping sample. With a mapping sample a common reference time is required in relation to position updates to a mapping sample, which should represent a snapshot of positions. In practice the response time for each probe update is expected to be different. Successful transmission of an update depends on the access channel loads and may further be affected by network delays. To resolve these time differences an artificial synchronization can be used by using the technique proposed to map queues, in order to overcome delays in updates to a mapping sample. The technique refers to the capability of the mapping system to determine a reference time for a mapping sample and the capability to transmit such time to the probes as a time reference for required position updates to a mapping sample, as well as the capability of probes to store past positions for such purpose, that could be used to enable a probe to transmit a position update that corresponds to the reference time determined for the mapping sample. This update message should include indication that would enable the mapping processor (part of the mapping system that arranges updated reports from probes to mapping samples and determines the queue length and other parameters of the queue) to identify the relation between the position related updates and the mapping sample. For example, a probe update will include reference to the mapping sampling time of the informed position, either directly, or indirectly by referring for example to a serial number of a mapping sample or to a control message that corresponds with the mapping sample or a combination of such possibilities. This would help the mapping system to arrange informed position related updates according to respective mapping samples in the right order. It would rather be an advantage to get from a probe, automatically, auxiliary information such as motion rate in the queue and planned direction of the travel after passing the exit point of the queue. This information could be determined by the probe according to current position and planned route, for example, if a car navigation system is used, or by sensing the blinking direction lights of the car, otherwise, an image route plan, stored in the mapping system can be used with selective queries. According to special control-message from the mapping system to probes, and in case probes could distinguish between lanes, it would in some cases be an advantage to get lane distinguished position report from probes, in order to be able to map lane related queues. Preferably the auxiliary information, provided by probes, would include estimated time when traffic light changes to green and its time period, or otherwise time and position of the first response to green light could be provided to help the mapping system to perform the estimation. (It should be noted that the sampling time is not very sensitive to an accurate estimation of green light turn on time, since mapping samples are preferably being taken with respect to the time that queues approach a maximum length, in which case there is a delay between the green light turn on time and the time of its actual effect on the most significant sampled segment which is the end of queue). Green light related timing could help to synchronize the probes to transmit time related positions preferably required by the mapping samples so that a farthest probe in a sequence of mapping samples would best reflect the maximum length of the queue, as described elsewhere. This timing could also be used as reference time to construct mapping samples for mapping any intermediate stage, at any point of time between two subsequent times when green light turns on, when the queue is expected to be shorter than its maximum length in a traffic light cycle time. The green light timing could be estimated according to times of transition, (from stop to start), which probes experience in their motion along the queue. Preferably valid start, in this context, would be defined when motion velocity exceeds a defined threshold. The threshold would preferably be defined according to one or more parameters such as minimum velocity, minimum acceleration, duration of maintained average velocity, minimum distance of travel, condition of passage of a certain point e.g. road junction, (as further explained with respect to the use of information about exit point). Another way is to estimate the timing of the traffic lights by the mapping system, based on raw data received from probes. This would require auxiliary information, preferably provided with the probe position report, which would include also position related to the transition time along with time of the transition. Such transitions should consider some threshold, such as minimum motion ahead in the queue in order to make the report more reliable. Probes which are close to the exit may preferably have higher priority for the timing estimation. Another possibility to make the green light timing estimate is to make use of the computation power in the probe vehicles, based on traffic light exit point information. With such an approach, position of the exit point could be provided to the probes, by the mapping system, for example, through the radio network and the probe would make the time estimation to provide it as auxiliary information preferably along with a position report. If the probe processor has an access to a map of traffic light positions, then the probe can determine the position of the traffic lights according to the map. When there is no traffic light involved with a queue the sampling time for mapping samples could be determined arbitrarily and the mapping cycle time would determine the resolution of the length estimate. Mapping cycle time can be specific to a mapping process of a specific road. The departure rate could be used to determine the preferred mapping cycle for a required resolution of length estimate. Higher departure rate requires shorter cycle to preserve resolution of length estimate. The storage of past positioning in the probes could help the mapping system to control the access load of probes and to distribute it over time so that it would prevent bottlenecks in access to the PLMN/PDN, while preserving different required periods of mapping cycles for different roads. For this purpose the report times from the probes are controlled by the mapping system while the reports from the probes would refer to the timing of samples required according to specific cycle and reference time similar to timing used with specific green light. The control messages could even consider whether to allow access or partial access of probes to the network when the load on the network is high. Such messages could be provided along with the triggering messages to start a construction of mapping samples for a certain segment of road, which include sampling timing and road segment for the mapping sample. When an update according to a position, e.g., traffic light controlled road, or according to threshold that most likely informs about a slow down but not on a typical queue e.g., relatively high speed of traffic, then a homogeneous segment of road could be considered for the same traffic level. This could hold for any of the mentioned mapping systems in order to simplify process when accurate mapping of queue might not be required. With the implementation of the second option, (using non modified PLMN/PDN approach), the access of probes to the mapping system through the radio network is different from the one suggested in implementation of the first option, and hence there is a need to consider the way to gather the mapping samples as described above. Once a set of mapping samples is constructed the estimation of the length of the queue is the same for implementation of the second and implementation of the first option and, is performed according to the farthest probe in the set of mapping samples as suggested earlier. As also mentioned, rapid estimation of the length of the queue requires to use pre stored statistics of the average arrival rate of vehicles to the mapped segment of the road and, average arrival rate of probes or otherwise the percentage of probe in the arrivals. Such statistics can be either constructed or refined in real time by using concatenation of non overlapped segments of mapping samples. This may require concatenation with respect to a sufficient number of mapping samples. With the implementation approach of the second option the position resolution is determined by the probe and could follow the resolution of the in vehicle positioning sensors such as GPS, dead reckoning and, even map matching when car navigation is used. The estimated number of vehicles between two positions of probes in the concatenated samples will remain the same as suggested elsewhere in this application and could rely on a predetermined average occupation length of a vehicle. As for the reports from probes it would further be preferred to keep anonymity and to use a single (uniform) identification for probes so that anonymity will be preserved.

A combination of the first and the second option is also possible. For example to implement the search process by using the first option, while using the second option for the implementation of gathering mapping samples.

In accordance with the first option of the method of mapping queues, the process of gathering position related updates from probes, associated with the construction of mapping samples, is being made through a PLMN or a PDN, which allocates radio communication resources to pre-assigned slots, according to a predetermined protocol associated with the PLMN or PDN.

With a further implementation of the first option the PLMN or PDN is equipped with a special unit in a base station that detects received signals in pre-assigned slots and according to a predetermined protocol converts the information associated with the detection to a respective bit stream which is further transmitted to a mapping processor as a data message.

In accordance with the second option of the method of mapping queues, the process of gathering position related updates from probes, associated with the construction of mapping samples, is being made through a PLMN or PDN and wherein the position related updates are data messages transmitted by probes according to a data communication protocol associated with the radio communication medium and wherein a message includes the position related data and auxiliary data that enables to determine time associated with the position related update.

With a further embodiment of the implementation of a mapping system and probes it would be preferred to exploit radio spectrum resources in an efficient way that would save the need to frequently broadcast mapping control messages (queries that trigger probes to respond to a mapping process). This possibility could derive from the characteristic of a queue mapping process which in addition to the requirement to take a minimum number of mapping samples (depending on the percentage of probes in the traffic) a queue would typically require a continuous mapping process to track the queue parameters during a few minutes and sometimes even much more. During this time duration it might be unnecessary to repeat a trigger mapping request, and it would be enough to either allocate communication resources according to predetermined protocol, or in the case of using the non modified PLMN/PDN approach to enable further non solicited updates from probes to the network, according to a predetermined protocol. In order to prevent a situation wherein due to some probes which might have failed to receive an original trigger message and therefore not respond will reduce the effectiveness of the mapping process, it would be preferable according to a predetermined protocol to repeat through a broadcast the trigger message with a cycle time which is longer than the response update cycle time. In case of probe updates that are being provided through pre-assigned slots it would be preferable to use such communication resources dynamically for different roads at different times. In such a case a trigger message may change the allocation of pre-assigned slots from one road to another, and as a result a probe with a position relevant to the previous road and which might have failed to receive such a message might interfere and violate the update to the new mapped road. In order to prevent such possible violation it would be preferable to repeatedly broadcast, in a short cycle, according to predetermined protocol short messages that notify about changes of allocation of specific pre-assigned slots, preferably the latest ones.

In a further embodiment of the invention, it would be sometimes preferable to predict the number of probes that plan to arrive at a given road, which is being mapped by the mapping system, within a certain forward period of time, e.g. the next time interval between two successive or non successive mapping samples. Such a prediction could be made in a short duration of time and would help to determine more quickly the local percentage of probes in relation to the total number of vehicles arriving to a mapped queue within a given time period. As a result a more accurate determination can be made, from the initial stages of a mapping process of a certain queue, of the time period in which a number of mapping samples are to be gathered according to required accuracy level of the length, for estimating the average length of a mapped queue. This would actually reduce the response time of the system which would possibly enable to obtain a more accurate mapping of length of queues. This is due to the assessment of probe percentage being predicted and made available to the mapping system at the initial stages of mapping rather than as result of information accumulated in the course of the mapping and enable to eliminate the need for a data base of off line statistics. When very few probes (e.g. 2%–5% of the vehicles) are expected to arrive to the mapped queue, usually as a result of the low percentage of probes relative to the overall number of vehicles arriving to a certain mapped road at a certain time, it might take a relatively long time before an acceptable estimate of percentage of probes could be derived out of concatenation of non overlapping mapping samples. In order to reduce the time, a counting method with respect to transmissions of probes in pre-allocated slots, selected by the probes according to a distribution criterion that exists among them or according to an artificial one, could be used by the mapping system to evaluate the number of probes planning to arrive to a queue in a forward time interval. With this counting process and according to a predetermined protocol probes that plan to arrive in a predetermined forward time interval will transmit a signal in one of a plurality of pre allocated slots, specially allocated by the mapping system for such transmissions. When a natural distribution is used by a probe as a criterion for the selection of a slot to a signal transmission, the allocated slots could be assigned according to time intervals of arrival to the mapped queue or according to distance from the queue or a combination of these criteria. When an artificial distribution is considered a random process can be used by the probe to select a slot for the signal transmission. Any possible combination between selection criteria could be used to increase the confidence in the process. The proportion between the number of slots that were used by probe transmissions and the number of pre-allocated slots could be used to determine the number of probe transmissions. Preferably the number and the individual assignment of the various allocated slots would a-priori enable to discriminate with high probability between the transmitted signals in different slots in order to evaluate with high confidence the number of such probe transmissions by counting the number of slots in which there was a response. This counted number when put in proportion to an estimated number of the vehicles expected to arrive in this forward time interval could provide an estimate of the relative percentage of probes in the forward time interval with respect to the queue being mapped. This method can be used in a combination with a conventional method to estimate the percentage of probes when a few or more non overlapping mapping samples are becoming available and hence could be concatenated in order to be used as a sample for estimating the percentage of probes according to e.g., parameter estimation of a probability distribution function as described with another embodiment. For example if the time interval is statistically long enough the arrived probes in the mapping samples can be used in proportion to the number of the arrived vehicles to provide the percentage of probes according to Maximum Likelihood Estimate of a Binomial parameter counted number, for the elapsed time interval, and the counted number according to the counting process could be used in the same way for the forward time interval, and hence a combination of these two estimates can be used e.g., using maximum likelihood combining estimate. According to a predetermined protocol a number of such counts could be summed in order to evaluate the percentage of probes according to longer time intervals, or relatively long time intervals could be used with each counting process. In this respect the allocation of slots in a mapping process could include in addition to pre-assigned slots for gathering a mapping sample a number of auxiliary slots for the counting process, either allocated according to a predetermined protocol with each mapping sample or with respect to a group of mapping samples. The number of the auxiliary slots for the counting process should preferably consider an acceptable limit for expected probes in the forward time interval preferably determined according to the arrival distribution.

BRIEF DESCRIPTION OF THE DRAWINGS

In order to better understand the invention and to see how the same may be carried out in practice, non-limiting preferred embodiments of the invention will now be described with reference to the accompanying drawings, in which:

FIGS. 18A and 18B are tables showing computer simulation results of application of the method illustrated in FIGS. 17A and 17B.

Figure 1:
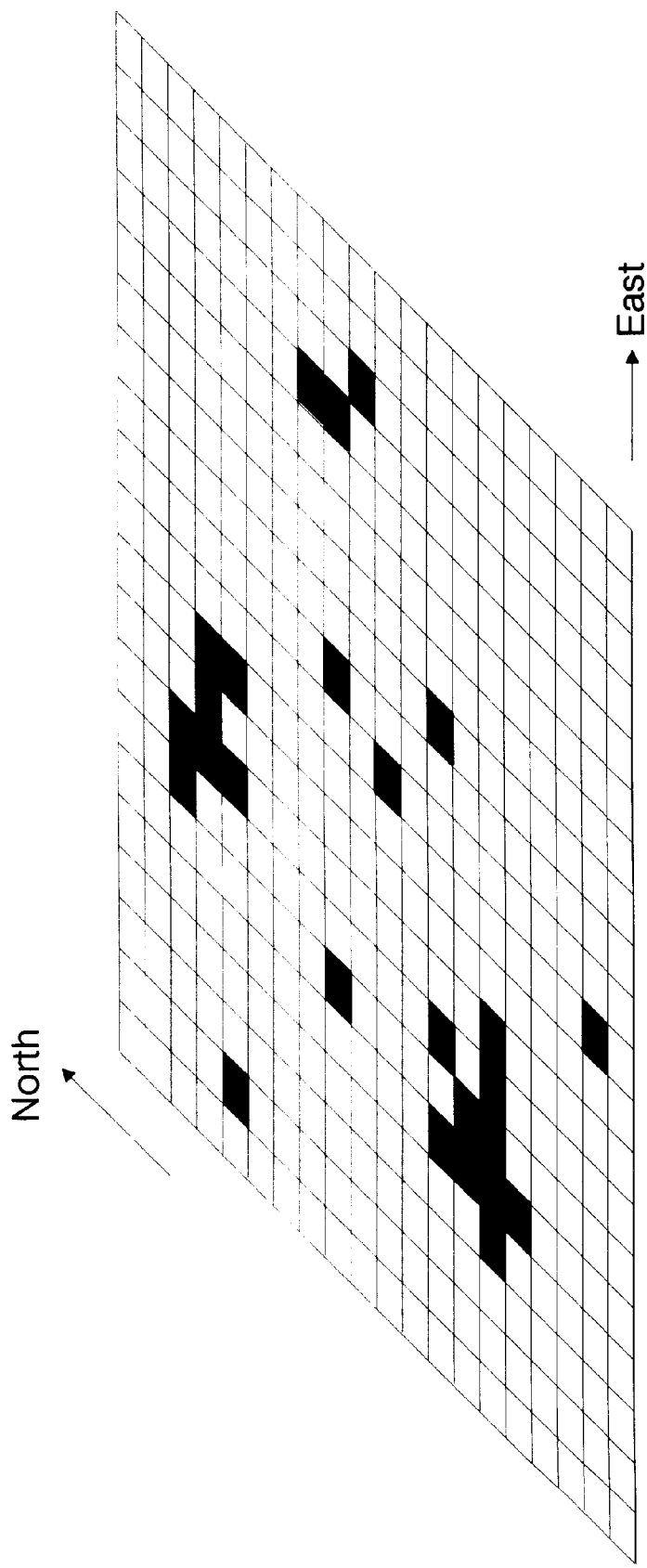
FIG. 1 shows an initial map generated in a prior art ITS system.

As a general note, wherever Car Navigation System (CNS) is referred to in above figures, and in general within this document, it may refer either to an integrated car navigation system which usually includes on-board (in vehicle) route guidance capabilities, usually based on embedded local maps and internal positioning capabilities, or to a Mobile Telematics Unit (MTU) which provides the driver with off-board route guidance (provided through radio network, by a remote telematics service) and usually includes a Telematics Computer (TC), local positioning and interface (direct or indirect) to radio networks such as PLMN or PDN.

Improvements

When assigned slots are allocated to construct a mapping sample according to a distance from a mapping focus, there is a way which enables to reduce the number of allocated slots by considering that in any subsequent mapping sample, in mapping a queue of vehicles, it is just required to check if a new probe, arriving to the queue after a previous mapping sample, is farther from the mapping focus than the farthest probe in a previous mapping sample. Thus, in a preferable implementation process of sampling, the assignment of allocated slots in a mapping sample that is taken subsequently to a mapping sample in which the farthest probe was detected, can be limited for a segment in the road that starts at a position which was identified as the position of the farthest probe (from the mapping focus) in a previous mapping sample, and extends in a direction farther from the mapping focus, for a length which may preferably be determined from statistical data. Additional slots may preferably be allocated exclusively to the farthest identified probe in a mapping sample, in order to determine the motion rate in a queue according to the motion distance of the farthest probe in between successive mapping samples. These slots could be used by such probes for transmission of data in any one of two ways, either by regular modulated data communication, or by constructing a respective code by means of which such a probe may use more than one of these exclusively assigned slots in order to determine its motion distance.

By arranging the allocated slots in an opposed order to the queue, i.e., an order in which the increase in time corresponds to a decrease in distance from the mapping focus, (and thus the first assigned slot would be allocated to the farthest position from the mapping focus in the mapped road segment), and by using feedback to the probe which enables to stop the process of sampling in any one mapping sample, it is possible to save communication resources. The feedback message that would be transmitted to the probes would enable to stop the sampling process for a mapping sample when detecting the first probe (in the reversed queue) which by definition is farthest probe for the mapping sample. Furthermore, the opposite order of allocated slots could also be assigned in order to limit queue mapping to a minimum predetermined range of interest from the mapping focus, in order to save assigning slots for queues that are too short to be of interest. Any feedback message, e.g. busy bits (used with DSMA) or other appropriate message according to a predetermined protocol through the broadcast channel can be used to stop further responses from probes in any mapping sample.

Further saving of communication resources with respect to slot allocation could preferably take benefit of allowing the possibility of missing the detection of a probe in a situation where it is expected that the probe, if it would be detected, would not have significant effect on the determination of the length of the queue. For example, if an a priori knowledge exists about the probe percentage amongst the arriving vehicles in a segment of road, then if for example the probability of successive arrival of probes within a meaningful shorter distance (shorter period of time), compared to the expectation, is not sufficiently high, then an allocation of slots to such a segment of road would preferably be saved. In such cases where there is low significance of effect, rather than no significance, for the detection of probes, then the slots could be allocated for a shorter time, in order to save time at the cost of lowering probability to detect a probe.

When allocation of adjacent frequency slots are assigned with respect to different areas it would preferably be worth to allocate such slots to the respective areas in such a way so as to minimize the expected difference in radio propagation path loss between the respective paths from these area related slots and a common base station. This would enable higher discrimination between signals that might be received with a very large difference in received signal strength between each other, while enabling the small signal to be detected.

DETAILED DESCRIPTION OF A PREFERRED EMBODIMENT

In large scale road traffic mapping systems, it is generally desirable to have a large enough pool of transmitting vehicles in the region such that there be a good chance that at least one and preferably a plurality of vehicles with transceivers transmit, according to mapping queries. The percentage of vehicles that are equipped with such transceivers determines levels of probability of success of identification of a stoppage or slowdown in traffic and the level of mapping the congestion.

In the embodiments of vehicle traffic mapping systems, described in conjunction with FIGS. 1–4, a focus of the mapped congestion is identified without any need for a priory knowledge of intersections (which may be a focus of congestion) by the broadcast query system. The efficiency of this strategy can be improved, in a preferred embodiment of the invention, by using maps within the broadcast system in order to identify and determine a tentative focus of a congestion, as for example an intersection. In addition, no mater how a focus is determined, the efficiency of the system can be improved by vehicles reporting their position (in response to a query) as distance and direction from a focus, or if they have internal maps, as distances along a branch from an intersection or focus of a disturbance on an open road. This can provide a relatively high accuracy of estimated length of jams based on distances from the focus, utilizing a relatively smaller percentage of vehicles being equipped with mapping transceivers. Preferably, this will utilize and assume a computation logic that logically fills the gaps between the focus and the measured length by artificial responses of vehicles on the (virtual) map, experiencing the same congested conditions. Effective use of repeated mappings, as described below, can vastly improve both the probability of detection of congestion and the accuracy of its mapping.

Alternatively, the focus can be determined at a central station and broadcast to the vehicles for use as the reference position for reporting distances.

In a large city, reliable mapping might require a large number of vehicles, albeit a small percentage of the total number of vehicles equipped with mapping transceivers. Furthermore, even when one of the vehicles is in a queue it is difficult to estimate the position of the end of the queue from an instantaneous position.

In accordance with a preferred embodiment of the present invention, jam length mapping of a slowdown or stoppage is based on a distance and direction of vehicles from a focus of a slowdown. This distance may be an intersection or, in the case of an accident, for example, it may be the site of the accident. Use of distance and direction (initially) from a focus as the transmitted information, rather than transmission of the two dimensional mapping for position of the vehicle, is more bandwidth efficient since transmission slots need be provided only for one dimension of positions rather than for a two dimensions.

Figure 2:
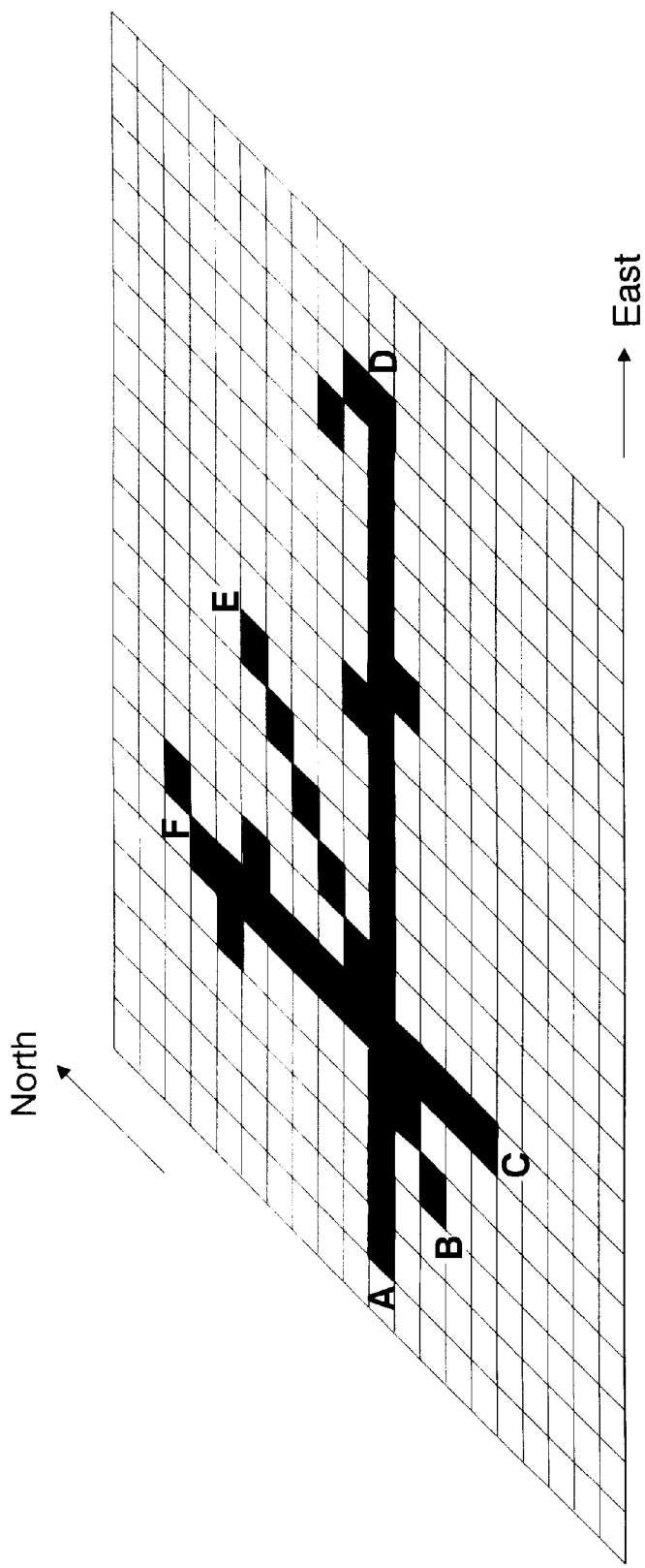
FIG. 2 shows a second, more detailed map, generated during a second iteration in the prior art ITS system.
Figure 3:
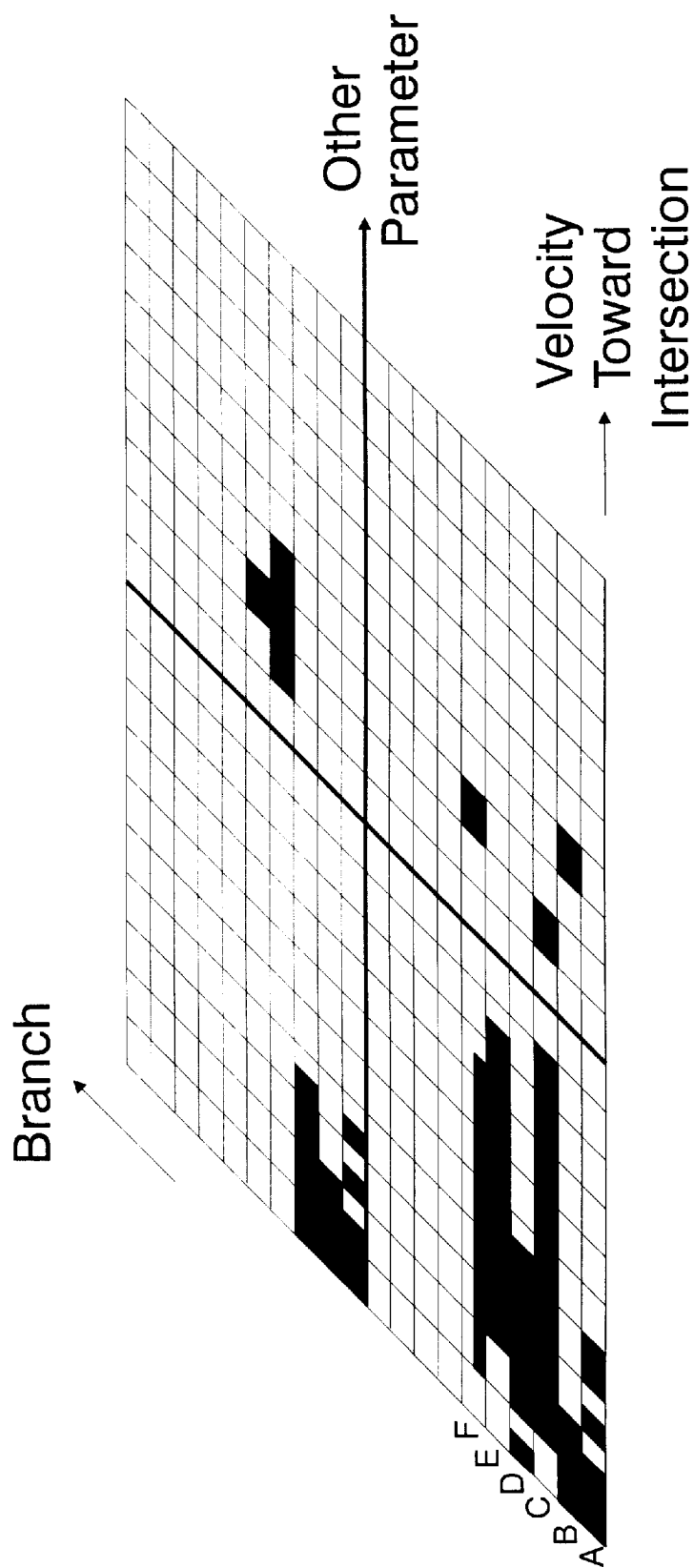
FIG. 3 shows a graph of additional information which is generated in the prior art ITS system.
Figure 4:
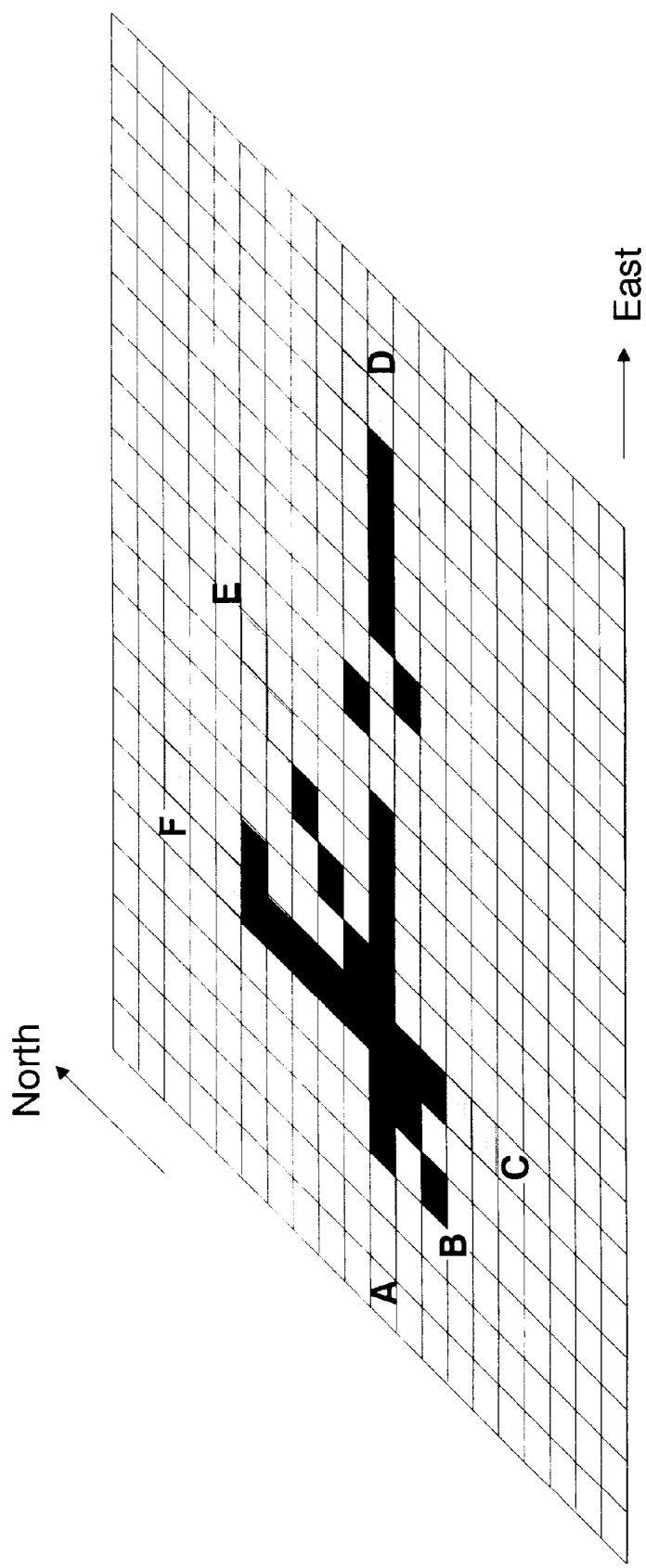
FIG. 4 shows a graph of further additional information which is generated in a prior art ITS system.
Figure 5:
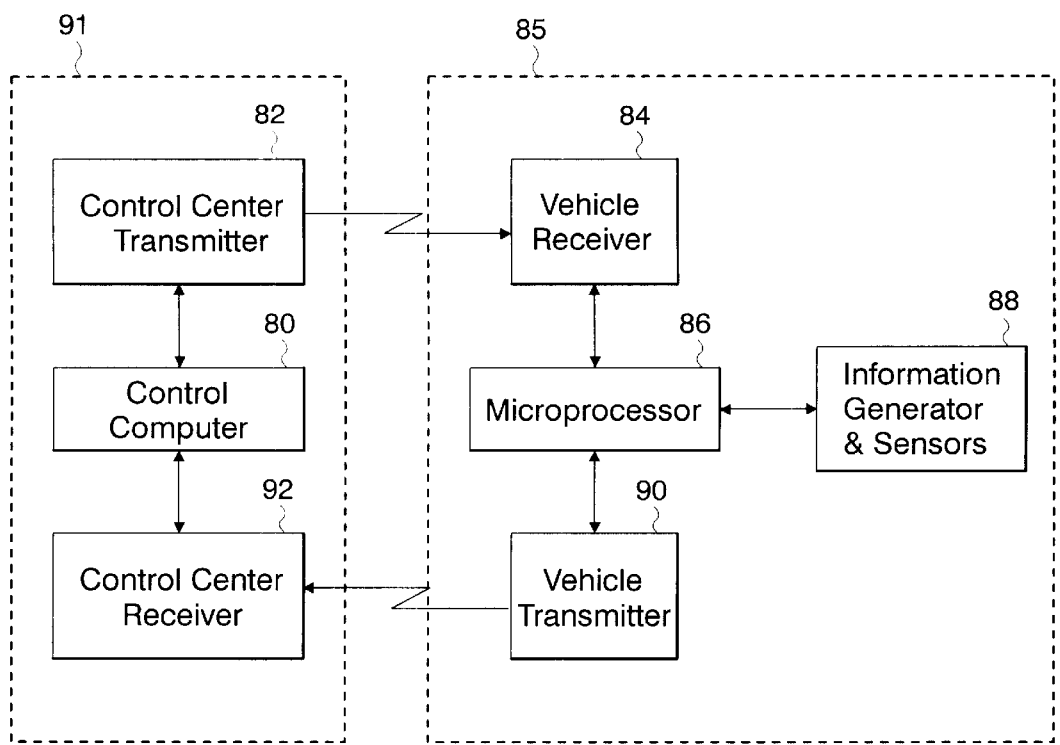
FIG. 5 is a general block diagram of a transmitter for the prior art ITS system, which is also useful in the present invention.
Figure 6:
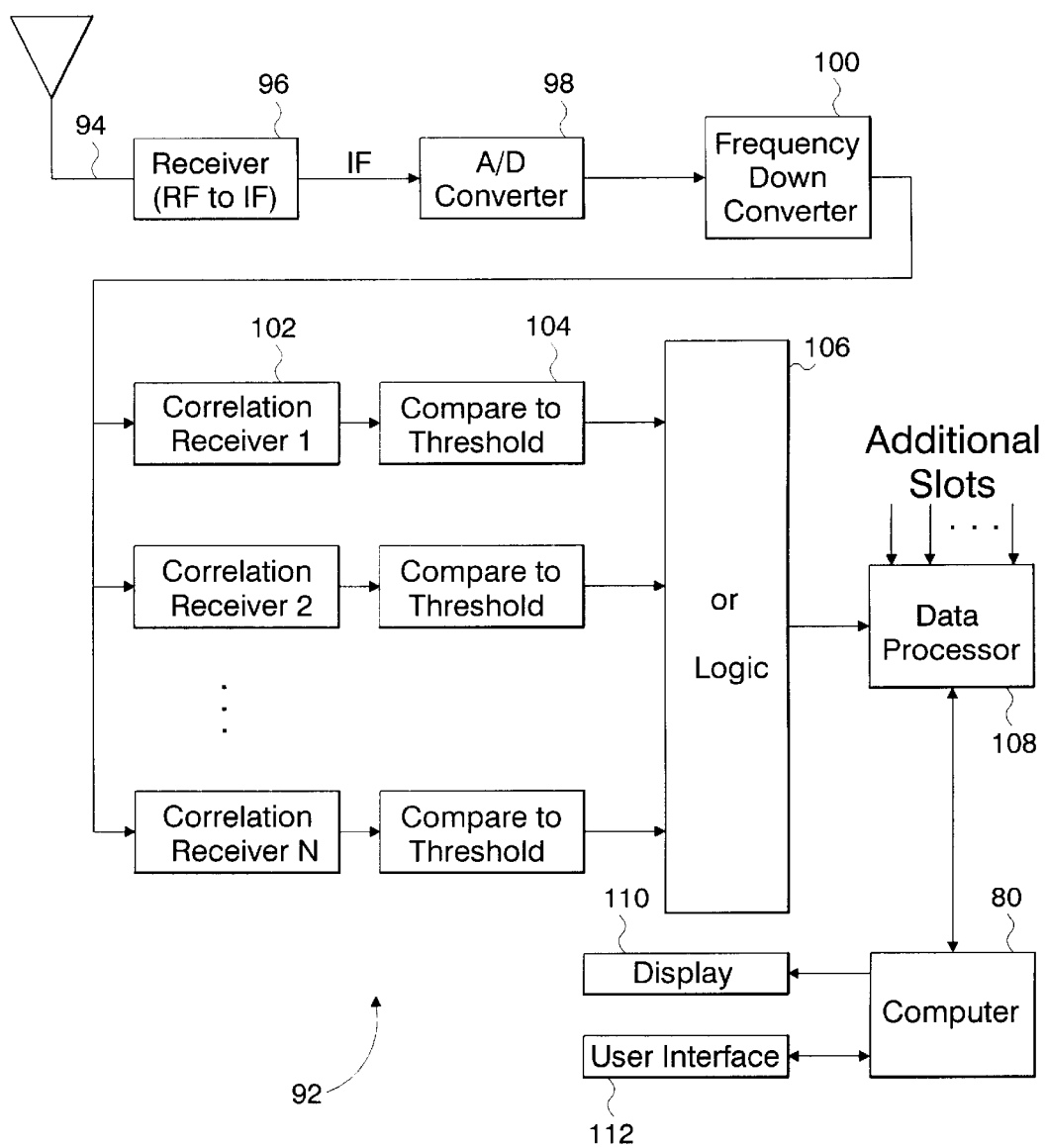
FIG. 6 is a block diagram of a receiver for prior art ITS system, which is also useful in the present invention.

In a preferred embodiment of the invention, where a vehicle reports a slowdown or stoppage (as a result of a query such as described in conjunction with FIG. 2 or 3, or some other method), while traveling towards an intersection, the focus is assumed to be at the intersection. For these foci, the queries and positions that are broadcast are based on a distance from an intersection. If no intersection appears to be related to a slow down, the focus is unknown, possibly until a first vehicle passes the focus and speeds up and can respond to a query that maps such a condition. In order to identify the focus and confirm the focus as an intersection when it has been assumed to be such, a vehicle preferably records the time and position at which its speed increases to indicate that it has passed the focus. Then query based or other methods may be used to identify and map one or a plurality of foci. For example, such a query could include the criteria that vehicles which were in the slowdown and speed up (at a focus) respond in one or a plurality of slots, for example position slots corresponding to the position on the road at which they speed up and optionally, time indicative slots corresponding to the time and position at which they speed up.

Such queries can be extended to give an indication of the position of the focus and the length of time it takes a vehicle to traverse the slowdown. This can be implemented by the same or another query that use the current time as a time reference in the query, with the time at which the vehicle first experienced the congestion being the requested information in respective slots. Thus, the focus and elapsed time experienced by the vehicle in the congestion provides an indication of the traverse time for the congestion.

In a preferred embodiment of the invention, means are provided for minimizing the false alarms in slots that cover the portions of roads beyond the actual congestion. One strategy to minimize such false alarms is to minimize the length of the road, leading to the congestion, which is mapped. Under this scheme, the number of slots (i.e., the length of the road being mapped) is gradually increased based on long-term statistics and refined by short-term statistics of the current mapping process. Thus, for example, the length could be some multiple of the distance from the focus of a previously identified vehicle, pass-out speed of the vehicles, etc. Another way of reducing false alarms is to correlating successive mapping cycles to determine "non-repeats." Thus, for example, if on one mapping cycle a vehicle at a given distance from the focus reports a slowdown, this indication would be ignored if on a successive re-mapping cycle no corresponding report at the same or a closer position to which the vehicle could have progressed, is reported.

Alternatively or additionally, the position of the focus of the slowdown is identified from a source external to the system or by any other method. Before the position of the focus is known it may be estimated as the position of the most forward vehicle in the congestion.

In a preferred embodiment of the invention, length measurement from a focus (in which a focus has been assumed or positively identified) is used for periodic remapping. In such a system, repeated remapping queries are periodically broadcast requesting that slowed vehicles moving toward a same focus to transmit their positions with respect to distance from the focus. This will continue as long as there is an indication of congestion around the focus. The data from successive cycles is used to fill in the interpreted picture of the remapped congested road, based on slow changes in the position of vehicles and vehicles that pass into and out of the congestion. This may be achieved by mapping the congestion periodically and combining a number of successive maps to provide a composite map of greater accuracy with somewhat lower, but still acceptable time resolution. Alternatively, vehicles may be asked to broadcast in a number of slots in the same mapping cycle, where they broadcast in all slots which represent their position within a given prior period. In both cases, each vehicle represents (virtually, for the map) a number of vehicles at different positions within the slowdown.

Also, for focuses that are intersections, it may, under some circumstances, be possible, for example when using query based periodic remapping, to improve the accuracy of the remapping by synchronizing it with the periodic clearings of the congestion at the intersection caused by traffic light changes. The synchronized time could be identified by focus/time related reporting as described above.

In preferred embodiments of the invention, it is not necessary for the portion of the system that is in the vehicles to have reference maps. Rather, the queries request information from vehicles traveling toward the focus, that are in positions of interest.

Alternatively or additionally, the vehicle may associate its position with a road stored in a road map memory. Under these circumstances, each segment of road may be assigned for the purposes of initial queries to local groups and sub-groups, corresponding to areas. During mapping, when the resolution reaches a given level, or during remapping, short map related codes based on road coordinates and on the position of the focus, are transmitted according to assigned "one dimensional" slot allocation mapping.

An indication from a single vehicle that it is stopped or slowed at some distance from an intersection (or from some other point) may be caused by a number of conditions unrelated to an actual traffic stoppage. For example, the car may be stopped or slowed due to a non-traffic cause such as a malfunction which may neither affect traffic or be the result of a traffic condition. Furthermore, if the proportion of cars in the total population is small, the probability that a car will be at or near the end of the traffic slowdown may not be sufficiently high. Thus, the measurements of the length of the stoppage or slowdown have an inherent accuracy depending on the percentage of vehicles with mapping transceivers in a region and in a mapped road. It is desirable to increase the resolution of the measurement of the length of the stoppage or slowdown and to increase the reliability of determination that a stoppage or slowdown exists, while using a relatively small percentage of transmitting vehicles.

In general one or more of the following means and methods for improving the reliability and/or resolution of traffic mapping, using a relatively small percentage of vehicles that are equipped with intelligent mapping transceivers, are provided, in accordance with preferred embodiments of the invention:

1) Requiring that at least two distinguishable vehicles be stopped at a same traffic stoppage, otherwise ignoring the transmission that represents a single vehicle (i.e., a single slot).

2) Where there is slow moving traffic (with vehicles passing through and out of the congestion and new vehicles passing into it), estimating the end of the traffic slowdown by the furthest vehicle from a focus of a slowdown (an intersection or an accident, for example).

3) Repeating the mapping during a period of time that is longer than a relatively short mapping cycle time and providing a map based on two or more of such repeated cycles. This multiple remapping information may be transmitted during multiple cycles or during a single cycle as described above. Since one can expect (and predict statistically) that additional transmitting vehicles will enter the congested road, this remapping method gives a better estimate of the length of a slowdown, albeit with a loss in time resolution. Note that this may result in the same vehicle being mapped during multiple remapping cycles or it may result in different vehicles being mapped from different cycles. This method is based on the assumption, which is usually correct, that within a one or a few minutes using two or more mapping cycles there is no significant change in the length of the queue on the congested road. Thus, the loss of time resolution of using multiple remappings in mapping a jam is not significant. It is possible that, if too long a time, or too many repeats are used in forming a map, the map may represent a statistical peak in the length of the congestion. This can be avoided, if necessary, by limiting the number of multiple queries utilized in forming a map.

In preferred embodiments of the invention, there is an overlap between successive groupings of mapping cycles (i.e., windows) that are used to form an estimate of the length of the congestion. That is to say, in a subsequent estimate, the oldest mapping cycle result in the previous estimate is discarded and replaced by a later mapping cycle result. In this way, the result is updated more often than it would be if non-overlapping groupings were used for sequential estimates. Alternatively, non-overlapping groupings are used. This results in correlation between successive windows. However, to avoid occasional large sharp fluctuations in the queue length, it may be desirable to filter the output stream with a filter such as a median filter.

4) Analyzing the time development of the motion of a vehicle farthest from the intersection or other focus of a slowdown. Since vehicles periodically enter the queue, a plot of the position of the farthest vehicle will have an undulating, if irregular, form, with the greatest distance (peak of the undulation) representing the position of the end of the queue.

5) Evaluating the reliability of responses from vehicles substantially farther from the focus than a previously determined end of the congestion based on pass-out rates and on an expectation of an additional response in a similar position (or somewhat closer position, based on an estimated vehicle velocity through the congestion) from the vehicle. In some preferred embodiments of the invention, each vehicle keeps track of its last few positions and transmits, as its position, its largest distance from the focus of the congestion, while it is moving slowly. In other embodiments, each vehicle transmits its actual relative position (preferably in a slot in response to a query) and either a central station or other vehicles, as described below, calculate an estimated length of congestion.

For clarity of presentation, the following definitions of terms are provided:

1) a "map" is a single response to a focus related mapping query, generally based on responses in allocated slots;
2) an "overlay" is one of a series of maps that is used in determining an estimate of a length of queue in a congestion situation;
3) overlaying means estimating the length of a queue by overlaying a series of maps such that the longest queue estimate from these maps (i.e., the response that is farthest from the focus) is used as the estimate of the average length of the queue;
4) a "window" is a period during which overlays are combined to estimate an average length of a queue;
5) a "probe" is a vehicle that can respond to system queries;
6) a "mapping cycle" is the time between two overlaid maps;
7) "departures" is the number of vehicles that clear the queue, past the focus of congestion, in a given cycles;
8) "average departure rate" is the average number of vehicles that clear the queue, past the focus of congestion, per cycle; and
9) "average arrival rate" is the average of a Poisson Probability distribution that governs the arrival of vehicles at the end of the queue.

In general, it is applicable to estimate the average length of the queue, when the statistics governing the process is stationary. When the average queue length is changing (as in developing congestion) it may be desirable to report either the average length of queue during the multiple queries or the (statistically) average queue length referenced to the last overlay in the window. The term "average" queue length as used herein is the queue length averaged over a number of trials (e.g., a number of overlays), to reduce the effects of statistical variations in the length of the queue. Such statistical variations occur in any statistical process, even if the process is stationary, i.e., it does not have any trend. In addition, if the process is not stationary, i.e., it does have a trend or other determined variation), it is generally desirable to first remove the effects of the trend or determined variations, for example using one of the methods described below, before utilizing the statistics of the system to estimate the center of the variations.

As shown below, the main statistical process is the number of vehicles entering the queue during a mapping cycle, which has Poisson statistics. When the clearance rate of vehicles per cycle is a constant, the length of the queue also has Poisson statistics, which may be stationary or not depending on the relationship between the average rate of entry of vehicles and the clearance rate. When these rates are the same, the statistics are stationary. However, this is seldom the case in the real world, especially on a short term basis and thus, in order to evaluate the queue length with best accuracy, it is desirable to reduce all non-Poisson statistical effects on the queue length.

It should be noted that just as too few queries (e.g., when the queue is too short) will result in errors in the length of the queue, too many queries (e.g., when the queue is too long) may also cause errors, although for a different reason. As with any statistical process, if the furthest distance is based on a large number of cycles, and the length within each cycle is determined to be the largest distance of all the samples in the cycle, there is an increasing statistical probability that the length will be overestimated by an overlaying process. The statistical probability for such errors will depend on a number of parameters, namely, the percentage of probes in the total number of cars, the number of queries that are "overlaid" and other parameters described below.

For a small percentage of probes, the statistics are poorer and the overwhelming effect for small numbers of overlaid maps there is a relatively high probability that no or too few cars will be in the queue and that the end of the queue will be poorly determined for this reason. In order to assure that the queue be optimally mapped, a number of maps should be overlaid, up to the point where the probability of error due to too long an estimate of the queue length is as large as the probability of the queue being measured as being too short.

On the other hand, when a larger percentage of probes are present, the probability of under reporting the queue length is reduced fairly quickly with number of overlaid maps, while the probability of over reporting is relatively high with increasing number of overlays.

It should be understood that the change in expected statistical errors caused by using a larger or smaller number of overlays for a single queue length estimation is generally not very large, under many typical conditions, if a reasonable number (such as four or five) overlaid queries are used. It has been determined by the present inventor that such typical conditions may be present if the percentage of probes is between 3–5%. However, for greater accuracy and under certain circumstances, the accuracy can be significantly improved by optimizing the statistics of the queries (i.e., the number of overlaid queries) and by synchronizing the queries with some cyclic event (such as the changing of a traffic light). The present inventor has performed a number of statistical studies to determine the optimum number of overlays, utilizing the first criteria described above. The number of overlays varies between about 3–5 for large percentage of probes (such as for example 3–5%) to 7 or 8 for small percentages of probes (e.g., approximately 2 percent), when a road with two lanes is joint, for mapping purposes as a single double density lane. Not unexpectedly, the mean error in estimated queue length is larger for small percentages of probes than for large percentages.

The parameters that appear to affect the (statistically) optimum number of overlaid queries and the expected errors for various situations have been determined by the inventor. In making this determination, the inventor has performed statistical studies of the (assumed) actual and reported queue lengths. In these studies the following factors have been found to affect the number of overlays to be used for statistically optimum results and of the statistically expected errors:

(a) the percentage of probes reporting in a sampled map;
(b) the average arrival rate per map (stationary Poisson distributed); and
(c) the departure rate per map (or the actual departures if known). Furthermore, these studies have shown that synchronizing the timing of the queries with the traffic light, reduces the effects of cyclic variations on the estimation of the length of congestion and assists in determining the average occupation length of a vehicle in the queue, e.g., based on map density, thereby to convert the size of the queue from length units into number of vehicles. This may be useful in estimating departure rates, estimating arrival rates and estimating the percentage of probes, as described below. Since it is not always possible to query the vehicles in the queue at exactly the desired time (for example, when two congestions, having the same query time are being simultaneously mapped using the same communications resources), in some preferred embodiments of the invention, the vehicles store position information, and provide this information to a later query. The vehicles may store position information for a specific time (based on a previously given command) or they may continuously store such information.

Thus, in order to optimally map congestion it is useful to know all of these factors in determining the number of queries to overlay in a mapping cycle.

In a preferred embodiment of the invention, the statistically optimum number of maps to be overlaid is determined based on the statistical probability of different types of errors. The criteria for determining the balance between the errors which is considered optimum is in some sense arbitrary, and is based, inter alia, on an assessment of which type of error is more problematic.

Figure 17A:
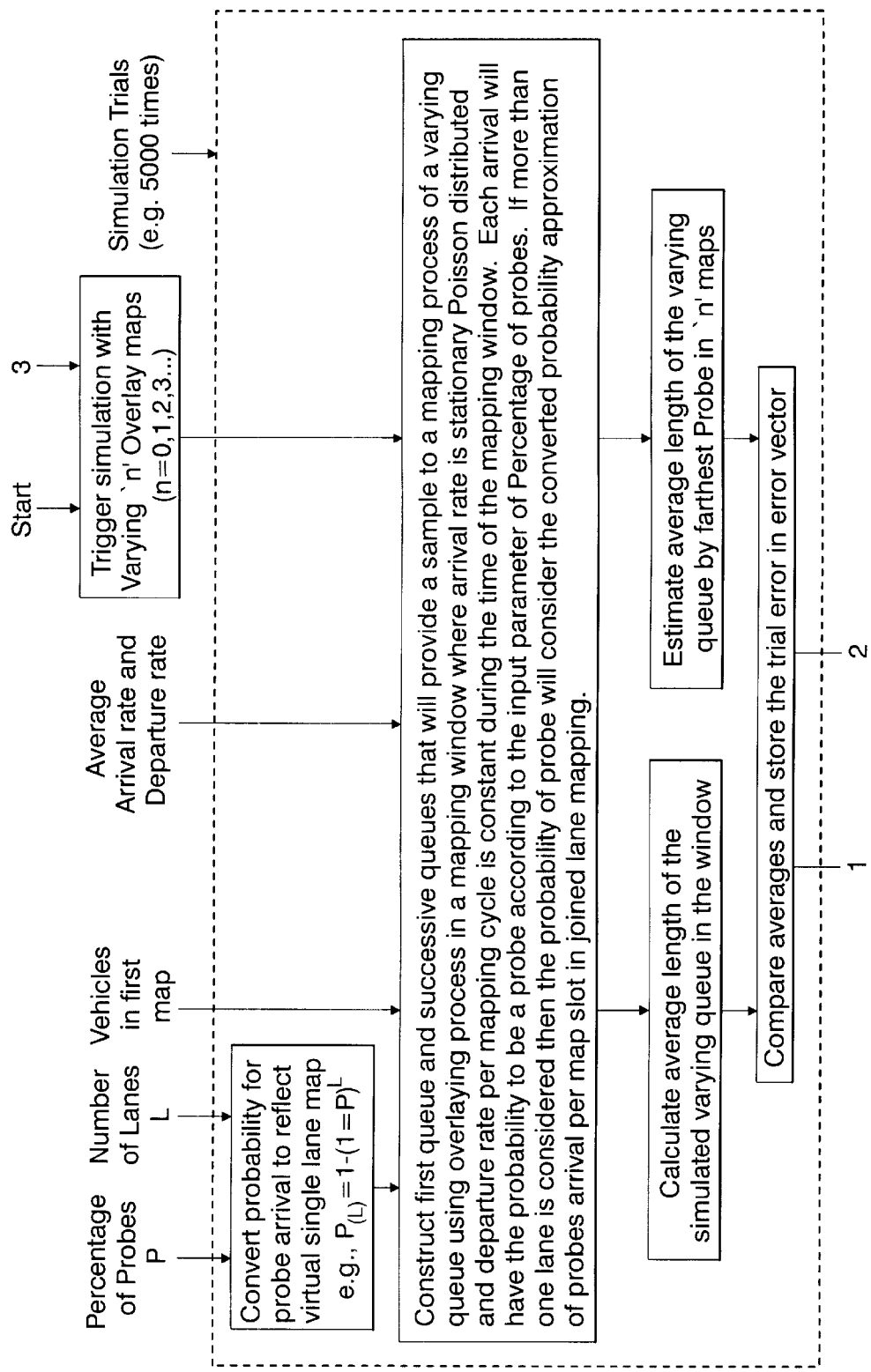
FIGS. 17A and 17B are a flow chart of a method for determining the optimum number of maps for estimating the length of a queue.
Figure 17B:
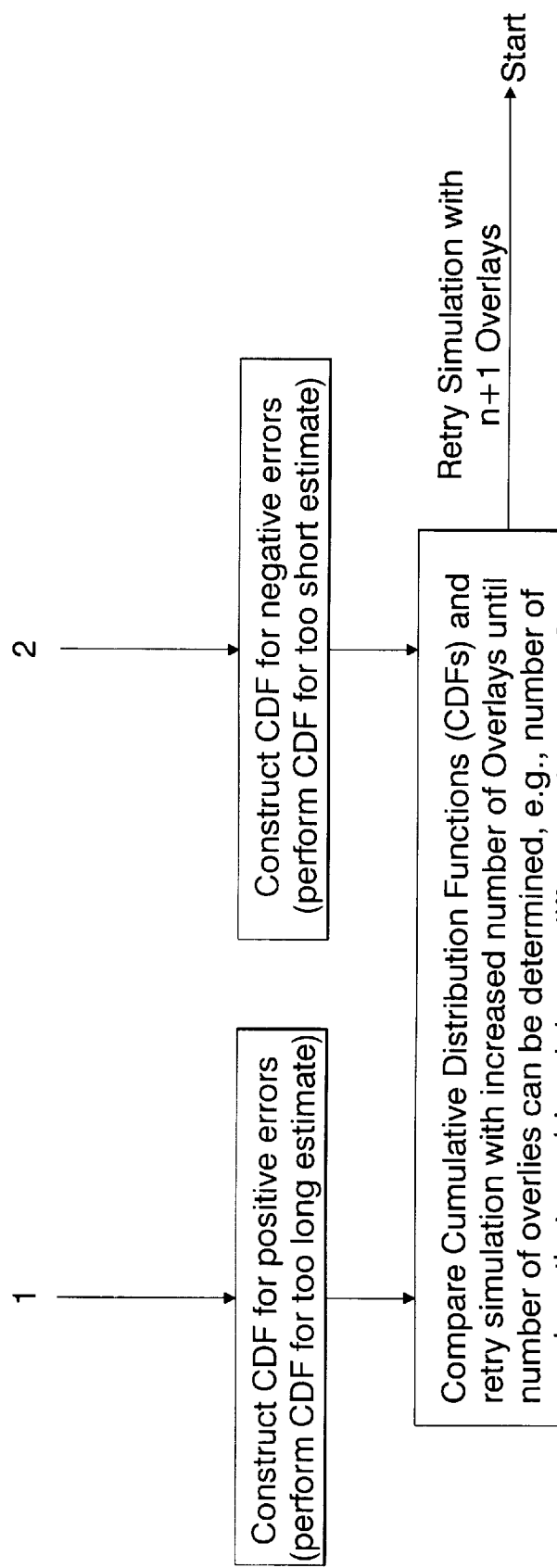

One possible basis for a criteria for determining the number of maps to be overlaid is to compare the probability that there will be an overestimate of the length to the probability that the system underestimate the length of the queue. One possible criteria is to set the number of maps in a window equal to that at which the two probabilities (and the average length of the error) are equal. FIG. 17 shows a flow chart of a method, utilized by the present inventor to determine the statistically optimum number of overlays. FIGS. 18A and 18B show a table containing some of the results of this study, for average departure rates of 20 vehicles per cycle and 10 vehicles per cycle, respectively. It should be noted that the flow chart of FIG. 17 is limited to a typical situation in which the average departure rate is equal to the average arrival rate. FIGS. 18A and 18B show the results of a more general simulation in which the average departure rate is not necessarily equal to the average arrival rate.

Other methods of determining the optimal number of overlays may be used. For example, in some situations it may be more important to be sure that the congestion is actually noted, In such situations, the number of overlays may be increased. In others, fast response, rather than accuracy may be important which would lead to a reduction in the number of overlays used.

As indicated above, the determined optimum number of overlays is dependent on a number of parameters, one of which is the percentage of probes in the total pool of vehicles and, more importantly at, or in, the queue whose length is being measured. While one can know the proportion of probe vehicles in the total vehicle population, it is difficult to estimate, a priori, the proportion of probe vehicles on the road as compared to the total number on the road, at any one time. It is even more difficult to estimate, a priori, the proportions at any one site, at any one time. It has been found in statistical studies carried out by the inventor, that having 3%–5% of probes is generally sufficient for giving fairly accurate estimates of queue length. Lower percentages can also give useful results while larger percentages give more statistically accurate estimations of queue length. Providing such a large percentage of probes in the general "population" of vehicles can be very expensive. However, one possible way to provide for a wide distribution of probes (without the great expense of equipping large numbers of vehicles that are used only sporadically) is to equip vehicles that are on the road a large percentage of the time, such as taxis and/or buses and/or other types of commercial vehicles, with transmitters. However, the distribution of such vehicles is not uniform (poor neighborhoods have few taxis present, for example) and varies with the time of day and the influx of vehicles during rush hours (during which times automobiles from outside the area increase the total number of vehicles without changing the number of probes).

Thus, while models may be constructed for determining an optimum number of overlays based on any particular criteria and situation, the required knowledge of the actual parameters is unavailable.

In a preferred embodiments of the invention one or more of the parameters affecting the statistically optimum number of overlays is estimated based on either "hard information" (direct information with respect to the changing times of traffic lights, for example), "soft information" (such as statistics of probe percentages based on prior surveys) or by the estimation of these parameters from the responses to the queries, themselves.

Figure 16A:
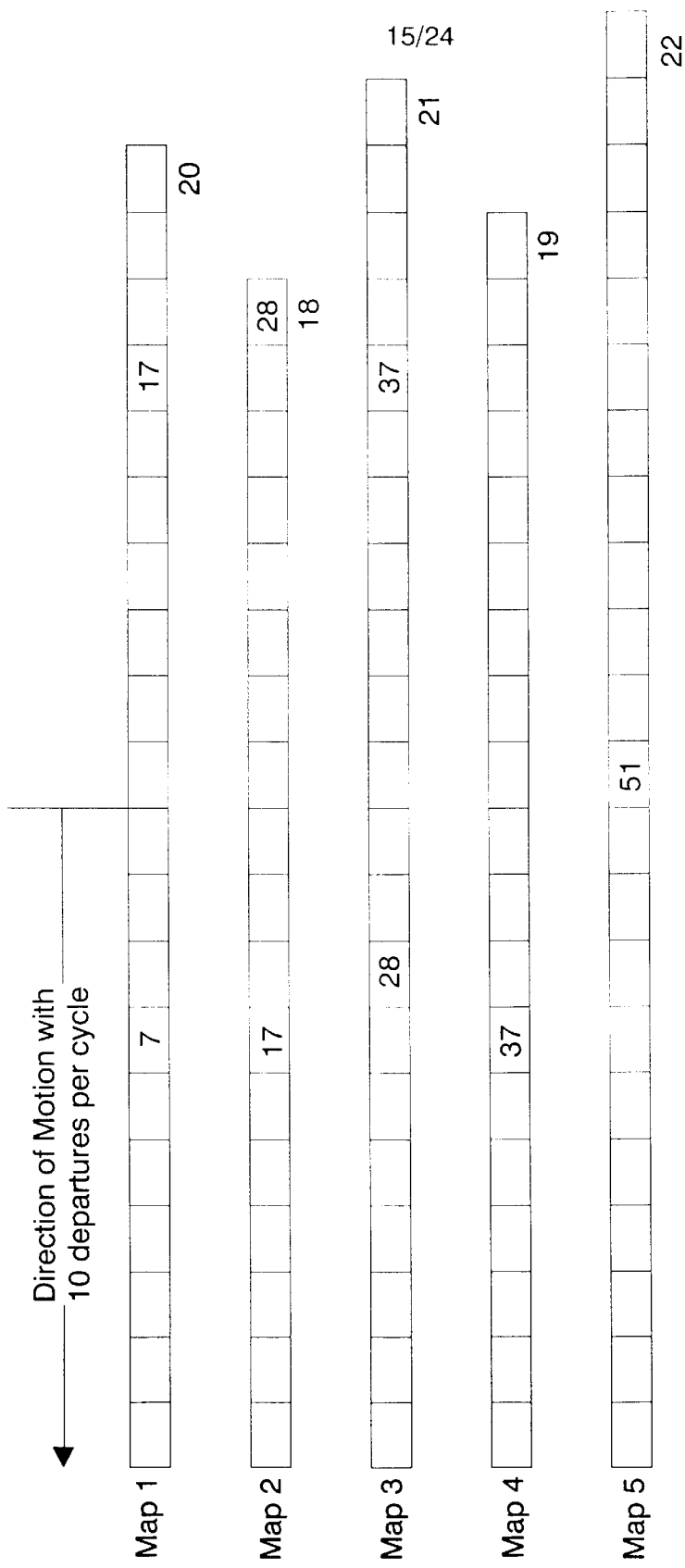
FIG. 16A shows exemplary results of computer simulation of queries of vehicle positions with respect to a focus of congestion, in accordance with a preferred embodiment of the invention.

FIG. 16A is a representative example of a series of responses to successive queries that are made at a source of congestion. It is presented, purely for illustrative purposes, to illustrate preferred methods of estimating the various parameters necessary for determining a statistically optimum number of queries (overlays) to be used in a mapping.

As a first step in this estimation process, the number of vehicles passing through the congestion (vehicles per mapping cycle) may estimated using any suitable method. Aside from its importance in determining the optimum number of overlays to be used in estimating the length of the queue, accurate determination of velocity can also be an important consideration in traffic control applications. In particular, the measurement of velocity is important in determining the delay time at a particular intersection and the average number of vehicles passing the intersection per/mapping cycle. The average delay time will be an important consideration in decisions related to rerouting of vehicles and the average number passing the intersection (in relation to the length of the queue) is useful in determining an optimum division of the cycle time of the traffic light among the different streams of traffic entering the intersections. However, due to the nature of movement of vehicles in congested situations, accurate measurement of velocity should preferably be made with care.

The motion rate of vehicles through the congestion can be estimated in several ways, in accordance with preferred embodiments of the invention.

A first method of determining the motion rate of vehicles is to compare patterns in successive maps. Since successive maps show substantially the same patterns, displaced toward the focus of the congestion by the motion of the traffic, the movement per mapping cycle may be determined simply be determined from the movement of the pattern toward the focus of the congestion. Such patterns can also help to distinguish between different velocities in adjoining lanes, since such different velocities will result in small changes in the patterns.

In accordance with an alternate preferred embodiment of the invention, the movement per mapping cycle is determined by determining the distance traveled by a selected vehicle between queries. Since the vehicles bear no identification, in preferred embodiments of the invention, this requires singling them out, based on some characteristic of the vehicles. One way of doing this is to find a relatively isolated reporting vehicle in the queue, estimate a velocity and look for the vehicle at the next query at a position estimated from the average velocity. This may be done with vehicles in the first few clearance lengths from the intersection or far from the intersection. A clearance length may be defined as the length of the queue that clears a traffic light for each cycle. This method may be advantageous because it may not require any special queries or calculations by the vehicles themselves.

Alternatively, the vehicles may be asked specifically to respond or not to respond, or to determine their own average velocity or distance traveled per cycle and asked to transmit this value during designated slots in a query.

Alternatively, in a special query, only the last vehicle in the previous map may be asked to transmit its position. Its position may then be known for two successive cycles, such that the distance traveled may be estimated.

Alternatively, a special query may ask only a particular vehicle (based on its previous position) to broadcast during the query. This enables isolation of the vehicle even when many probes are present. It is often simple to request that only the last probe vehicle in the queue broadcast in the following map. This vehicle will then become the reporting vehicle closest to the focus in the next map. In order to minimize the number of special queries, a predetermined protocol may be used whereby only the farthest vehicle from the focus may be instructed to respond in a successive map. Vehicles which enter the queue between the queries may broadcast their positions as usual.

These last two methods are illustrated in FIG. 16A, wherein vehicles are shown as boxes in a queue, each box representing a slot related to a mapping length of a vehicle, with movement being to the left. Empty boxes represent a vehicle space, occupied by an average length non-reporting vehicle and boxes with numbers represent reporting vehicles. In both simulations and actual mapping queries, as described herein, distances are denominated in "average vehicle lengths" or any other predetermined occupation length of a vehicle in a queue. It should be understood that reporting is based on distance from the focus, which for computational purposes may be replaced by an average vehicle occupation length. The average occupation length may be defined as the average occupation length in a standing queue (representing the highest typical density), or may be determined based on methods that take into account a varying queue density.

Since FIG. 16A represents a simulation, the actual numbers of vehicles in the queue at any one time is known (to the computer performing the simulation. Thus the "reported" results of the study can then be compared to the "actual" values. It should be noted however, that in order to determine the optimum number of queries to be used in a mapping, many trials must be performed with different statistics. It should be noted that the mapping shown in FIG. 16A shows a fairly constant spacing and throughput rate. This is useful for expository purposes, but is not generally the case.

From FIG. 16A, it is clear that vehicle 17 advances 10 predetermined vehicle occupation lengths between the first and second queries; vehicle 28 advances 10 such lengths between the second and third queries; and vehicle 37 advances 10 lengths between the third and fourth queries. However, two problems present themselves. First, in the actual situation, the vehicles are not identified. Second, no estimate of movement can be made between maps 4 and 5.

As indicated above, one way to overcome the first problem, in a preferred embodiment of the invention, is to perform a special trial (query and map) in which only the farthest vehicle in the queue for the previous query (and possibly new vehicles which join the queue), determined according to the responding slot which is known to the responder, is asked to respond. In this way, the first (closest to the focus of congestion) vehicle that responds can be identified as the last vehicle in the previous map. Thus, its movement during the mapping cycle (and the movement of the queue as a whole) can be estimated. If new vehicles also respond to the query to form the new map, there is no loss of information needed for the determination of queue length by performing this type of query.

With respect to the second problem, in situations where the farthest probe moves out of the queue, no measurement of throughput is made. Unless the percentage of probes is very small and the queue length is very short, this should not usually be a problem, since if it occurs the estimated average motion per cycle can be used to estimate and bridge the gap.

In a preferred embodiment of the invention, the percentage of probes is estimated from the actual data, utilizing a concatenation of data from successive maps.

Figure 16B:
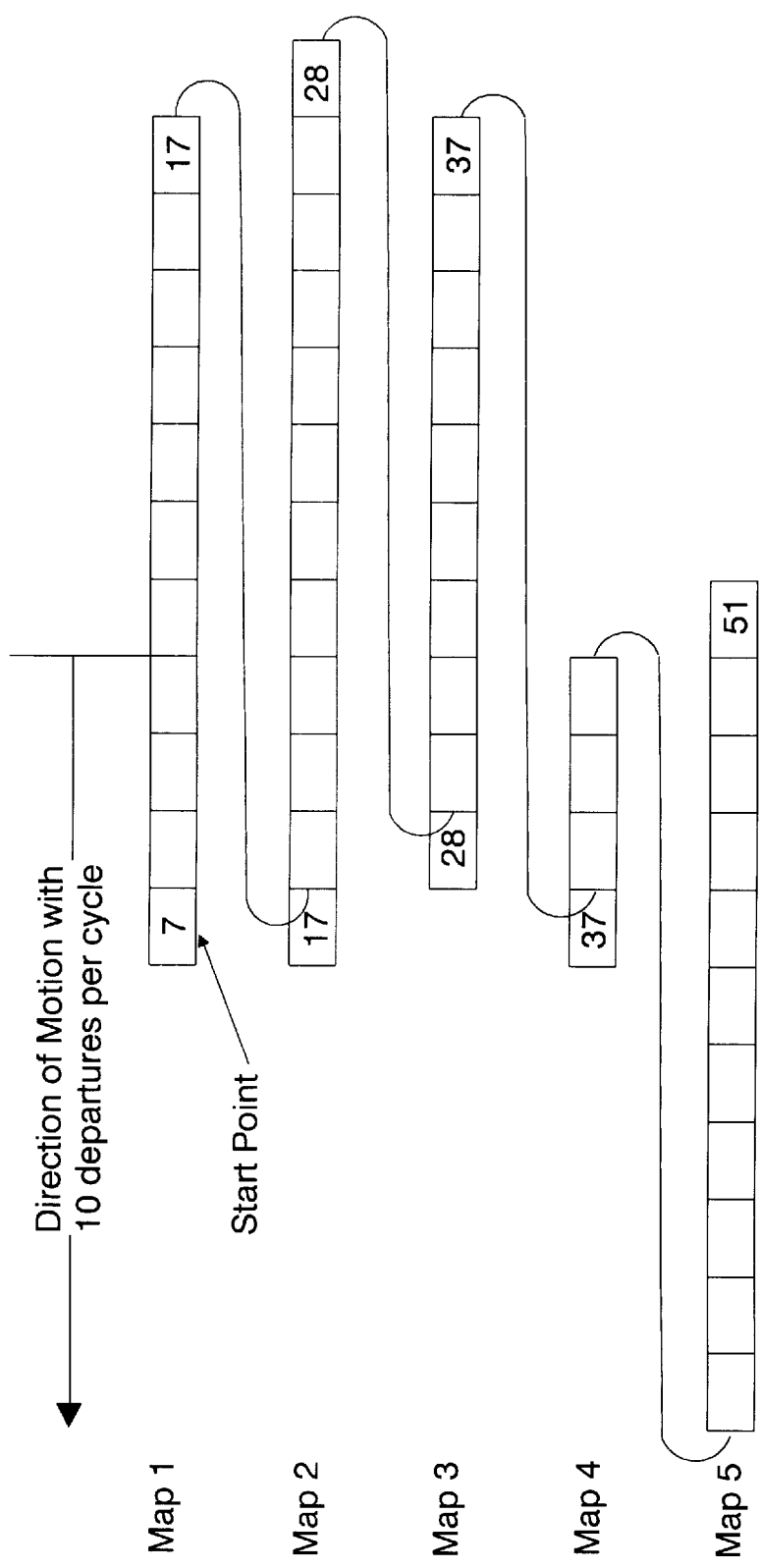
FIG. 16B shows a stream of traffic constructed from the queries of FIG. 16A.

In order to demonstrate how this is done, a single stream of traffic is constructed from the data of the five maps is shown FIG. 16A. This single stream is shown in FIG. 16B. As indicated, since the position of the reporting probes in the stream of traffic is known, these positions can be used to act as a bridge connecting the maps whenever a probe is present in two succeeding maps. This allows a simple connection between maps 1–4.

With respect to connecting maps 4 and 5, since an average throughput is known from the previously described estimation, the position of the first vehicle of map 5 can be estimated as being the vehicle after the last (tenth, in this case) vehicle to pass out after map 4. Thus, the sole vehicle to report in map S is placed fourteen slots after the vehicle reporting in map 4. A similar estimate may be made even if no vehicles respond to a given intermediate query.

Based on the density of probes in this stream of traffic, the probe density is estimated. The distribution of distances between vehicles is a geometric distribution Since the distance between two probes is the measured length divided by the average vehicle occupation length, then the number of vehicles between probes may be easily estimated. The probability of probes can then be estimated (for example using maximum likelihood methods), as 1 per mean distance between probes (in vehicles units). To improve these statistics, the length of the concatenation should be as long as possible and may include maps which span more than a single window and which include may past maps.

A third parameter that is known to effect the number of queries to be used in a mapping is the estimated arrival rate of vehicles. This can also be estimated from the stream of traffic shown in FIG. 16B.

In order to estimate the arrival rate of vehicles per mapping cycle, time related positions on the stream of traffic of FIG. 16B should first be determined. Then the number of arrivals per generated stream of traffic is estimated. Finally, the arrival rate per mapping cycle can be estimated.

In order to determine the time of arrival (vehicles/time) a first vehicle and its arrival at the far end of the congestion is determined. Then the arrival time of a second vehicle at the far end of the congestion is determined. The number of vehicles that arrive between the time of arrival of the first and second vehicles is estimated, based on the stream of traffic (FIG. 16B and the average vehicle occupation length). The average vehicle arrival rate is then estimated from the ratio between the number of vehicles (occupation lengths)

that arrive between the first and second vehicles divided by the difference between the times of arrival of the two vehicles at the congestion. The average number of arrivals per cycle is then determined by multiplying the average arrival rate by the map cycle time.

In a preferred embodiment of the invention, vehicles note their time of arrival at a congestion. When the arrival rate is to be calculated, a particular vehicle (which can be identified from its position in the current queue) is instructed or allowed to report its arrival time at the congestion, for example in special slots. A stream of traffic (such as that shown in FIG. 16B for the computer simulation) is constructed, for successive queries preferably utilizing the same methodology described above. When the stream is long enough, a second vehicle, identified as the one near the end of the stream in the previous map, is requested to transmit its arrival time at the congestion. This vehicle is also identified from its position in the then current queue as the first responder, according to a predetermined response protocol.

In a preferred embodiment of the invention, the number of vehicle lengths used in the queries and maps adapts to expected changes in the length of the queue. In one methodology, the length of the queue is based on previous estimated lengths and on any trends noted in the length. Alternatively or additionally, the length of the query (number of slots) depends on the net estimated arrival rate of vehicles, which are expected to result in a change in the length of the queue.

In each of the above determinations, a single lane of traffic is assumed. If multiple lanes of traffic are present, the maps may or may not differentiate between the lanes. If they do not, then the calculations do not differentiate between the lanes and the stream of traffic may be considered to be a "double density" stream. If the lanes are mapped separately, the data can be combined and the traffic flow calculated on the basis of double density. Alternatively, the congestion in each of the lanes can be determined separately.

When multiple lanes are present, special considerations sometimes have to be taken into account, especially for certain types of congestion. It particular, in preferred embodiments of the invention, the effects of turning lanes and the effects of merging traffic in a common direction are taken into consideration.

In accordance with a preferred embodiment of the invention, where turning lanes or merging traffic (as at a repair or accident site) are present, it is normal to expect traffic velocities to be different for different lanes in the same direction and timing of traffic signals to be different for the different lanes which move in different directions. One solution to the problems thus raised is to query each lane (or type of lanes) separately. This requires increased communications resources. Another possible solution is use information for determining the motion rate only from vehicles that are sufficiently far from the focus of the congestion such that the effects of the turning lane or merge are "homogenized, i.e., for which the effects of the congestion are the same for all the lanes. It is also possible to instruct vehicles which are turning not to respond to the query or to respond to a separate query.

Another problem in accurate determination of the length of the queue is that the length undulates depending on the phase of a traffic signal (where the queue is caused by simple congestion at a crossing). As indicated elsewhere, it is possible to measure such undulations and determine a value based on a particular part of the cycle. This may require taking a large number of measurements over a long period of time, since not only must the undulations be found, but they are preferably continuously tracked. If a priori knowledge of the timing of the traffic lights is known, as for example where the system is part of a larger traffic control system, this information can be used to synchronize the measurement with the cycle of the traffic lights, which presumably controls the undulations in the length of the queue. Use of such synchronization allows for the removal of the undulations and the determination of stable values of the queue length. The length of vehicle occupation in a standing queue may be more easily determined by mapping slots representing relevant lengths, e.g., slots representing the average occupation length of vehicles.

Alternatively, the timing of the traffic light can be determined automatically from a special query of vehicles which pass the traffic light. If such vehicles transmit their time of passing of the traffic light, this time can be combined with an estimated time for the vehicle to travel from its last known position to the light (based on an a priori or estimated functional relationship of time to pass as a function of distance) to estimate the actual time of the change to green.

There are several problems with using synchronized systems to measure length. One problem is that the effect of the traffic light change travels down the queue at some average velocity. Thus, while vehicles near the traffic light will begin the move soon after the light changes to green, and stop soon after the light changes to red, vehicles further away may only start moving only after the light has turned red. In extreme situations, vehicles may move in response to a previous cycle of the light and not in response to the current one. In many instances, vehicles far from the traffic light may actually move slowly all the time or be subject to stops and starts that are unrelated to the cycle.

Since there is much interest in measuring long queues, the measurement of such queues must be undertaken with care when using a synchronized system. In a preferred embodiment of the invention, the queries are synchronized with the traffic light cycle, preferably, with the turn on of the green (or just prior to the turn on of the green). However, the response of the vehicles is based on their own experience, such that not all the vehicles move in synchronism. For example, a relatively optimal time for making a query is just before the light changes to green, because at this time the longest line of vehicles will be stationary and the predetermined average occupation length of vehicles can be more easily and accurately predicted (e.g., for the purpose of estimating the queue length in terms of number of vehicles). When such a query is made, vehicles which are stationary report their present position. Those vehicles that are moving in a cyclic fashion report their position the last time they were stopped. Those that are moving slowly report their actual position at the time of the probing. This is believed to give a stable and consistent measurement of queue length. It should be understood, that due to instantaneous radio communication band-width limitations, the probing time may be different from the transmit time due to delays in sending the query or the responses, i.e., a query may ask for responses based on conditions of a previous map.

In accordance with a preferred embodiment of the invention, a series of computer mapping trials are performed (for example in accordance with FIG. 17) in which the errors with time are computed as a function of the various parameters given above. In a preferred embodiment of the invention, when mapping congestion, the parameters necessary for determining the optimal number of maps to be used in a window for determining the average queue length are determined based on the mapping trials. As set of the optimal number of maps are then combined to perform the mapping of the average length in a given time window. It should be appreciated that, while the above described methods are preferred for calculating/estimating the desired parameters, other suitable methods may also be used for calculating/estimating these parameters.

In a preferred embodiment of the invention, the longest distance from the focus to any probe for all the maps in a window is determined as being the estimate of the average length of the actual congestion. However, if the average rate of clearance of vehicles per cycle from the congestion is substantially different (e.g., more than about 5%) from the average rate of arrival of vehicles per cycle at the congestion, the distance of the last vehicle in each map is preferably artificially adjusted to account for the trend in the length of the congestion caused by the difference in arrival and clearance rates. The object of this adjustment is to remove any trend in the statistical distribution so that it is substantially a Poisson distribution and, then to estimate the average length of the congestion as described above and, finally, to readjust the estimate to correct the artificial adjustment One way of adjusting to remove the influence of trends on the average arrival rate and irregularities from the departure rate is to use the concatenation of the maps in a window and to reconstruct maps that do not include irregularities in the departure rate per cycle or trends in the average arrival rate. The departure rate per cycle as well as the average arrival rate can be calculated using the processes described above. This adjustment is preferably executed on the departure side of the road congestion, e.g., to compensate for a generally extending road congestion, the departure rate may be increased to shorten the mapping sample at the departure end. The adjusted maps in the window can then be used, in an overlaying process, to estimate the average length of the queue in the window., e.g., by selecting the farthest responding position (with reference to the focus ) among the maps in the window. The length of the window may be selected to include the number of maps that provides a minimal error in estimating the desired parameters. The tables in FIGS. 18A and 18B indicate, inter alia, the optimal numbers of maps in a mapping window of a system using 4 percent probes and a system using 3 percent probes. It should be noted that the percentage of probes (which is one of the parameters affecting the window length) may also be estimated, initially, and is consequently adjusted based on a concatenation of several maps before determining an optimal mapping window.

Readjustment of the estimated length of the queue may be necessary in order to determine the appropriate window length to be used for the queue length estimate, and to correctly estimate the length of queue. Such readjustment may be performed by changing the estimated length of the queue based on compensating for trends in the average arrival rate and for irregular departure rate.

Another way to take into account this adjustment and readjustment, e.g., for a changing queue length, is to reduce (or extend) the length for each map by an amount equal to the length that the map is expected to be different from the average length or from the length of the last query. The longest of these adjusted lengths for the different maps is then preferably used as the estimate of the length. The estimated length may then be further adjusted based on the trend so that it is referenced to the situation at the end of the window (last map) or to the average length during the window.

Where the clearance is known or determined on a per cycle basis, the calculation may be further refined to remove the effects of variations in the clearance in particular cycles on the Poisson distribution. When using per cycle clearance information, the position of the farthest reporting probe is adjusted not only for changes in the expected length of the queue based on average differences as described in the previous paragraph but also for the known (and non-statistical) changes in queue length caused by variations in the number of vehicles exiting the queue for each cycle.

In a preferred embodiment of the invention, the difference between the arrival and departure rates can be monitored. In one preferred embodiment, the rate is monitored by utilizing trend analysis of the lengths of the estimated queue length. Other methods, such as match filter analysis may also be possible.

In the foregoing discussion, the map cycle time is preferably determined based on a predetermined timing, such as the timing of a traffic light, to give an optimum estimate. It should be understood however, that where the congestion is based on an accident or a merge or the like, the cycle time is not fixed and may be chosen to achieve an acceptable system time resolution and/or length expected accuracy. The cycle time determines the motion per cycle (arrival and departure) and hence the resolution, with higher rates reducing the accuracy. Even for congestion at a traffic light, the cycle time may be set at two changes of the light, with decreased performance, but utilizing reduced communication resources.

The vehicle mapping and traffic reporting system of preferred embodiments of the present invention, provides wide latitude for distribution of computational resources within the system, between the individual vehicles, either when they are functioning as mapping vehicles or as receivers of information, and a central station. This distribution is possible, at least in part due to the simplicity of the computations required by the invention.

In preferred embodiments of the invention, vehicles determine their positions either absolutely using two-dimensional mapping or with respect to the focus of a congestion on a road using one-dimensional mapping. As an end result, a map of areas of congestion, based on the responses to the queries is provided to the participating responding vehicles and/or to other vehicles and/or to Computerized Navigation Systems in vehicles. These maps optionally include an estimated time necessary to traverse the congestion. In addition to construction of the maps themselves this requires a number of relatively simple steps (as for example described in 1–5 above) and collation of the information. Depending on cost and bandwidth considerations, these computations may be distributed among (a) computers in the vehicles which are transmitting their position (such that the vehicle broadcasts a furthest position from a focus in the last few mapping cycles or a number of positions from the last few cycles), (b) in a central station which receives the positions and broadcasts them to all the vehicles in the pool and c) in the receiving vehicles.

FIGS. 7–15 illustrate a system for the determination and mapping of areas of congestion in accordance with a preferred embodiment of the invention.

Figure 7:
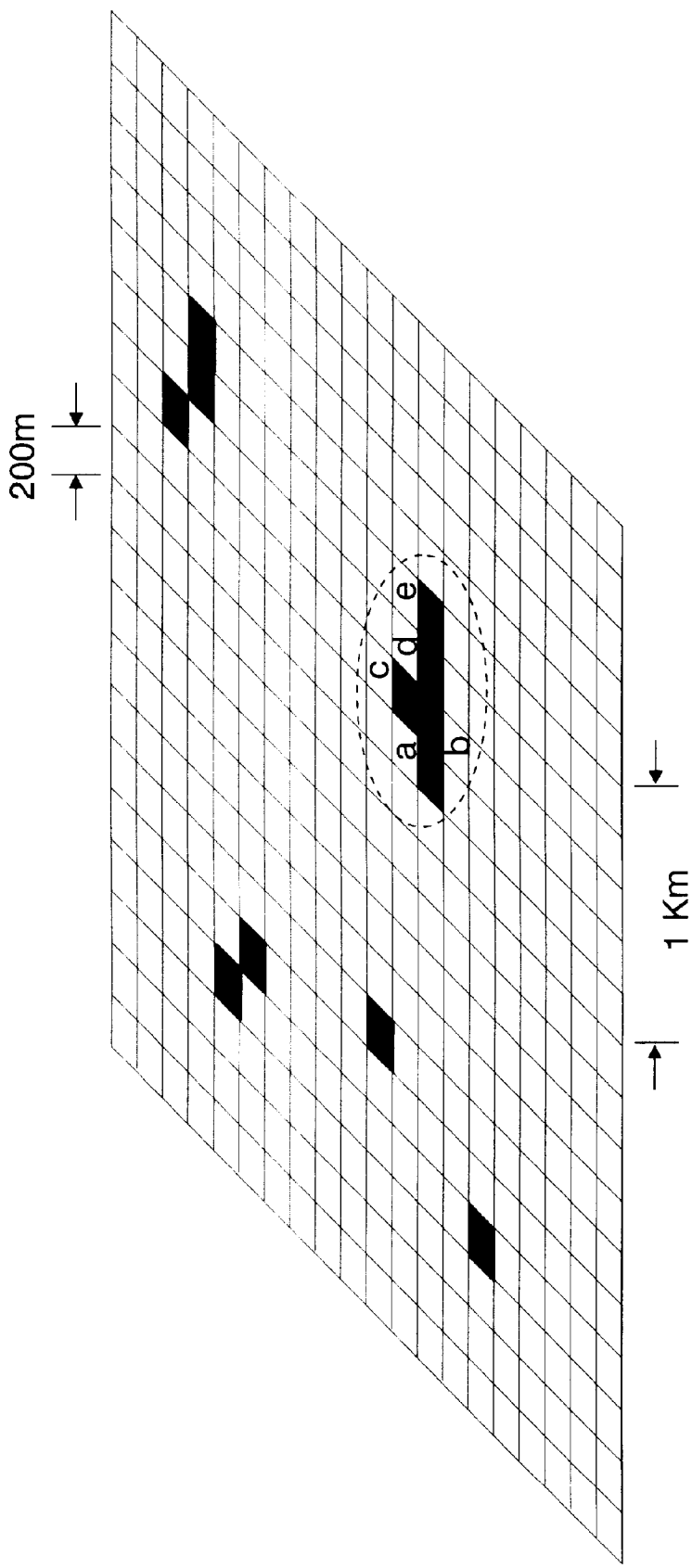
FIGS. 7–12 illustrate a scheme for traffic jam mapping, in accordance with a preferred embodiment of the invention.

FIG. 7 shows a response from vehicles in a first mapping stage, for identifying congested areas in which vehicles that are stopped or traveling below some speed have reported their positions preferably as described above, which are mapped as black rectangles in FIG. 7. A subsequent step can use one of two alternative methods, in accordance with a preferred embodiment of the invention. If a focus and branches can be identified according to the results of the first mapping step shown in FIG. 7, then a subsequent step is as shown in FIG. 9. If the focus cannot be defined the next step to be performed is described using FIG. 8.

Figure 8:
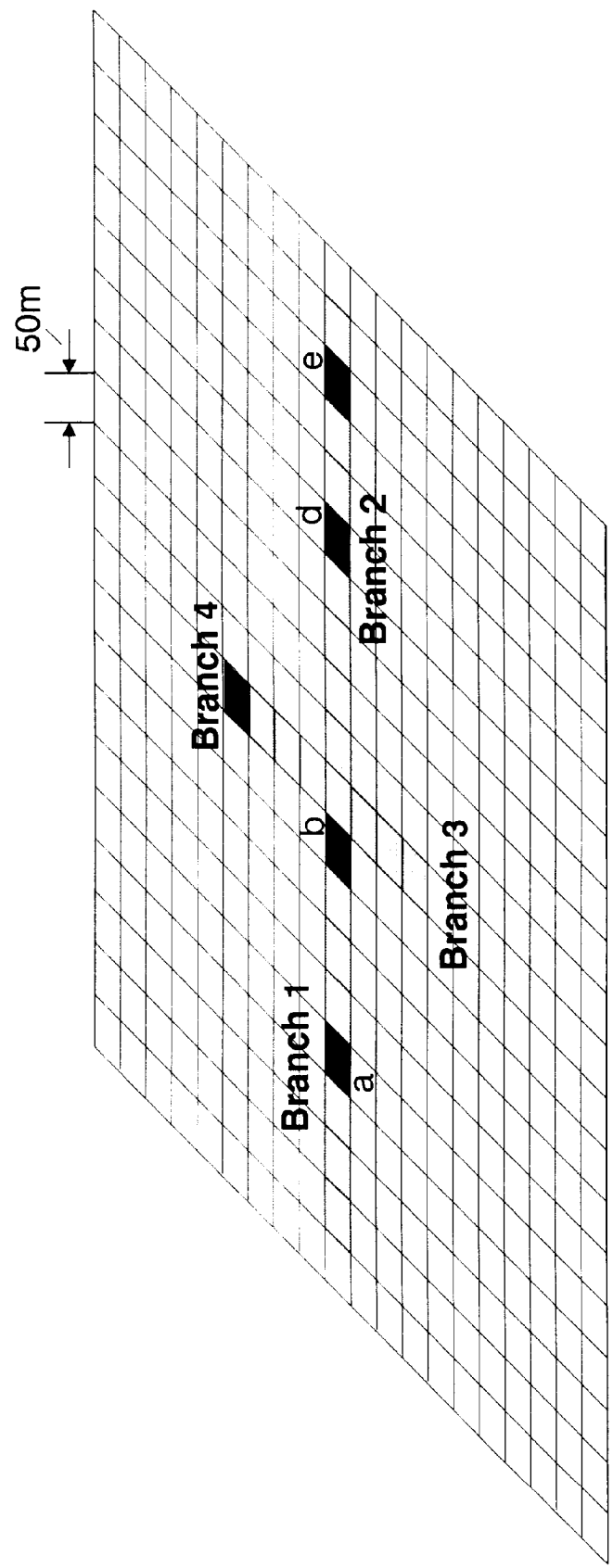
Figure 9:
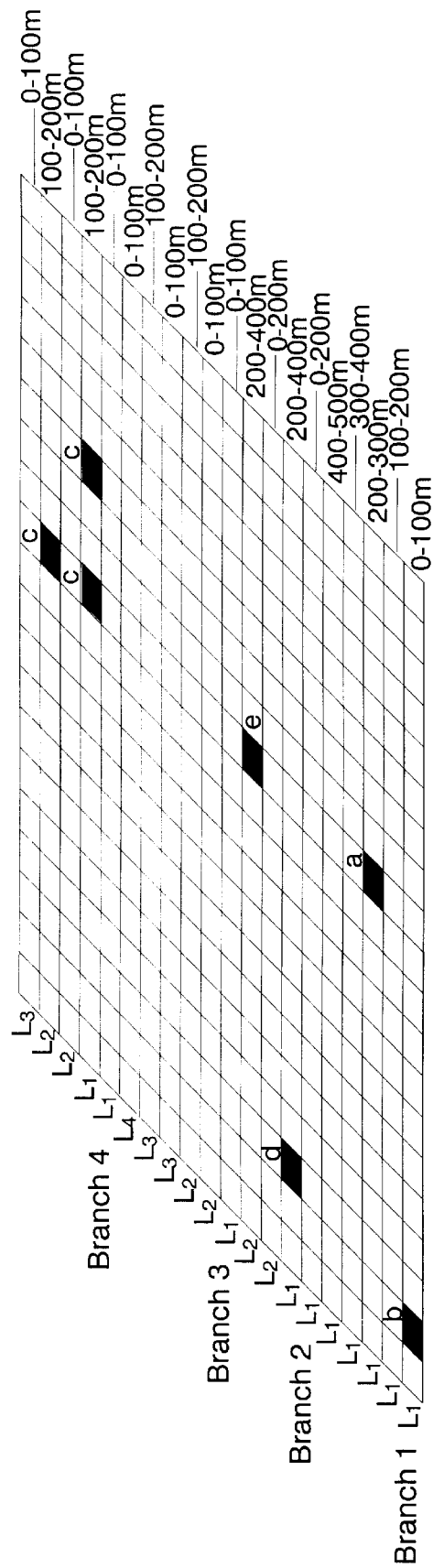

FIG. 8 shows a second, usually intermediate, mapping step in which vehicles (again mapped as black rectangles) in the vicinity of a focus of congestion (the circled area of FIG. 7) have been asked to report their positions, preferably in slots, at a higher resolution (50 m) than in FIG. 7. Note that 50 m is occupied by about 10 cars. The gray slots do not refer to responses, but to areas of the jam. After determining that there appears to be a congestion in the area circled in FIG. 7, in a preferred embodiment of the invention, the system switches from area based mapping to a focus based mapping, preferably, the one dimensional mapping described in FIG. 9. Note that up to this point there appear to be two vehicles reporting on branch 1, two reporting on branch 2 and one reporting on branch 4. However, FIG. 8 also shows the true length of the congestion which is under-reported in branches 1 and 2 and completely unreported in branch 3.

It should be understood, in this and the following Figs., the vehicles are not identified, only their position, with respect to the focus, is mapped. Thus, when a vehicle position is identified in several successive maps, this information is presented for the information of the reader, but the ID's are not known to the mapping system.

FIG. 9 shows a mapping response based on a congestion focus at the meeting of branches 1, 2, 3 and 4. Since the crossing of these branches is an intersection, it is assumed to be the focus of the congestion. In the response slots of FIG. 9, each of the branches (and not the entire area) is mapped with a resolution of 5 meters (about one car length, except for branch 2 that is mapped, in this example, with lower resolution). In addition, where there are multiple lanes in each direction, the mapping (in an optional feature) also determines which lane (L1, L2, L3, and L4) the vehicle is in, with preferably, the same distance from the focus being mapped for each branch. For some lanes, for example turning lanes, the total length of lane that is mapped is shorter than other lanes. When positioning resolution of GPS or dead reckoning resolution is not sufficient to determine the lane of the vehicle, then lanes can not be distinguished. However, the position of the vehicle in right or left turn lanes may be inferred from the turn indicators of the vehicle activated by the driver. Moreover, lanes may be combined to present a single stream of congestion. This is sometimes preferred since merged responses of this type reduces the number of slots required.

As can be seen, at the higher resolution, the single indication of a vehicle "c" in FIG. 8 has resolved into three vehicles. Note further that the same number of slots were used in the mappings of FIGS. 8 and 9. When the lane information is not transmitted, more frequent updates, lower bandwidth use (freeing the remaining bandwidth for mapping other foci of congestion) or higher resolution may be achieved.

It should be noted that if a focus (and its one or more related branches) can be identified from a low resolution query (such as that of FIG. 7), then the zooming of FIG. 8 may not be required.

Figure 10:
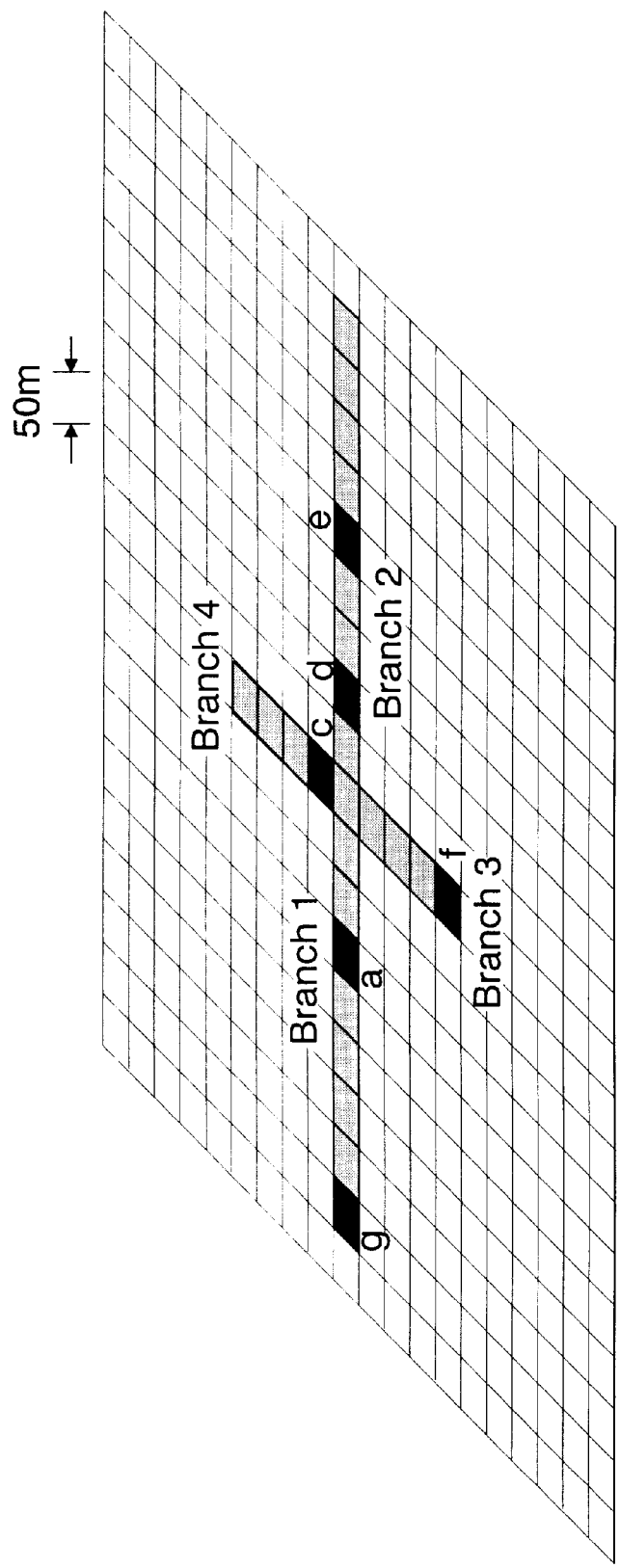
Figure 11:
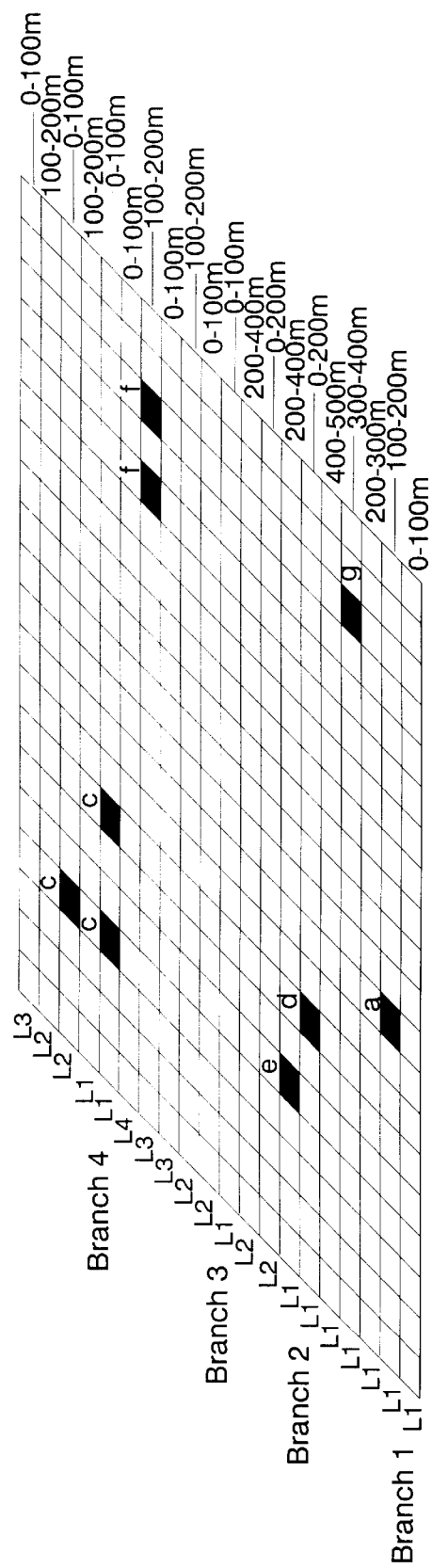

FIGS. 10 and 11 show reporting by vehicles at some later time, using the reporting/mapping systems. of FIGS. 8 and 9. This later time is, however, close enough to the earlier report, that the congestion is assumed not to have changed significantly. Again, the reported vehicles are shown as black rectangles and the true extent of the congestion is shown in gray. Note that vehicle b has left the congested area (by passing the focus) and vehicles f and g have entered it.

If only the reported positions of the vehicles as shown in FIGS. 10 and 11 were used to determine the extent of the congestion, the length of the congestion in branch 2 would be under-reported and the congestion in branch 4 would be poorly reported.

However, as indicated above, the structure of the congestion may be considered to be "quasi-stationary" at least over the time of several mappings cycles (e.g., one to a few minutes). With this in mind, for each of the branches, one may assume that the length of the congestion in each branch has not changed appreciably between the two (or more) reporting periods and only the movement of the few reporting vehicles causes the maps to change. Alternatively, the vehicles themselves may store their own position information for a number of cycles and broadcast either their largest distance from a focus (while in the slowdown) during the last few cycles, or may broadcast in a number of slots representing these past (and present) positions.

Figure 12:
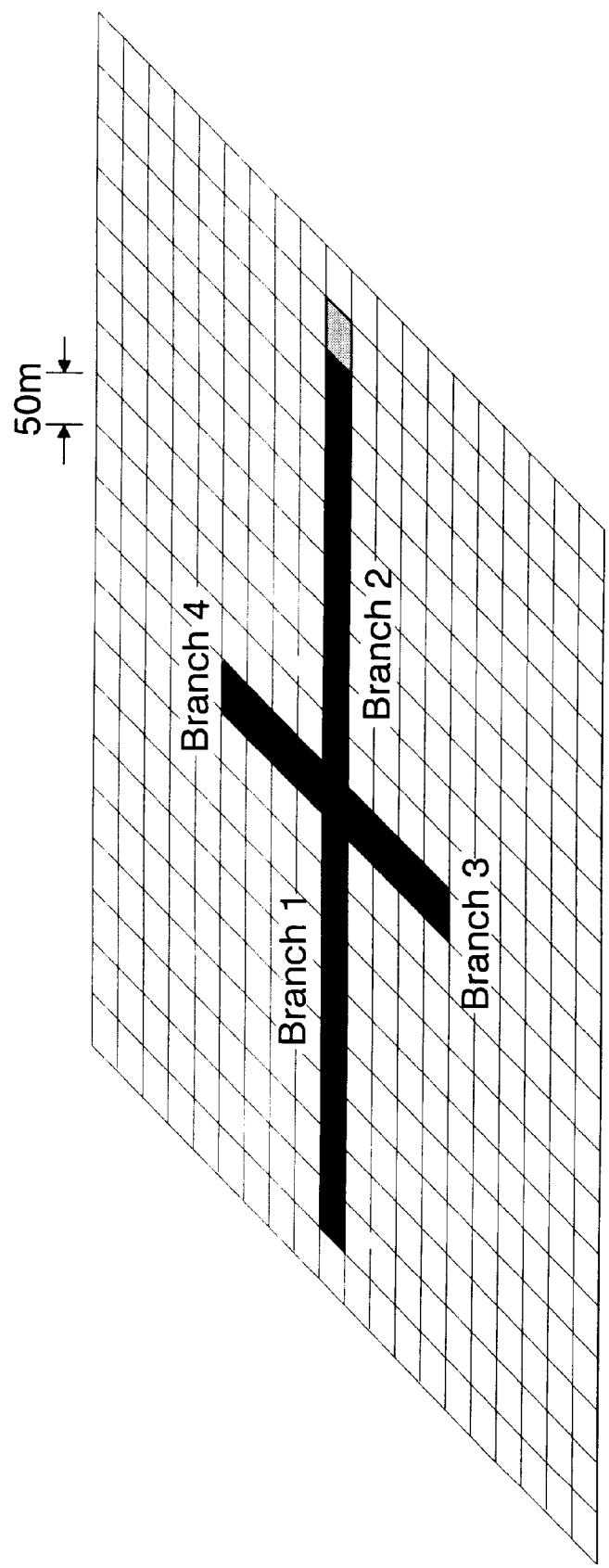

FIG. 12 shows a "virtual" map of congestion at the intersection, produced in accordance with the remapping method (using two successive mappings) described above and in particular with items 2) and 3) above. A virtual map includes not only present positions of the vehicles, but the entire estimated length of the congestion. The map of FIG. 12 shows the "known" congested area in black and an as yet unknown length of congestion in gray. The congestion lengths have been deduced by utilizing the vehicle positions reported in FIGS. 9 and 11. Note that the congestion length is known to a much higher accuracy than in any of the individual maps of FIGS. 8–11. Further remapping cycles are preferably utilized to further improve the accuracy of system.

It will be understood preferred embodiments of the invention, as described herein provides, with fewer reporting vehicles, improved resolution and accuracy of the length of a congestion, improved validity of congestion and frequent updates. By correctly choosing the time between remappings and the number of remappings used in forming a map, the accuracy of the mapping may be varied at the expense of time resolution.

The system described above may utilize a central decision maker which receives information from vehicles, plans the routing for each vehicle and then broadcasts a route or route changes to the individual vehicles. This type of system has the advantage that the routing for each vehicle takes into account the routing for the other vehicles and the control center, in computing the routings, can balance the routings to cause minimum delays or other optimizations. The disadvantage of such a system is the large bandwidth required to notify the individual vehicles of their individual corrected routes.

A second approach for routing systems which has been suggested is to have each of the vehicles compute its own route, based on some information about the present status of traffic which it receives from a central transmitter. While such systems require only a limited bandwidth, the routes computed by the individual vehicles cannot take into account the future effects of the routes of other vehicles. In further preferred embodiments of the invention, the actual congestion maps are also produced in the vehicles which receive raw, or somewhat collated information transmitted by the vehicles in congested areas.

Figure 13:
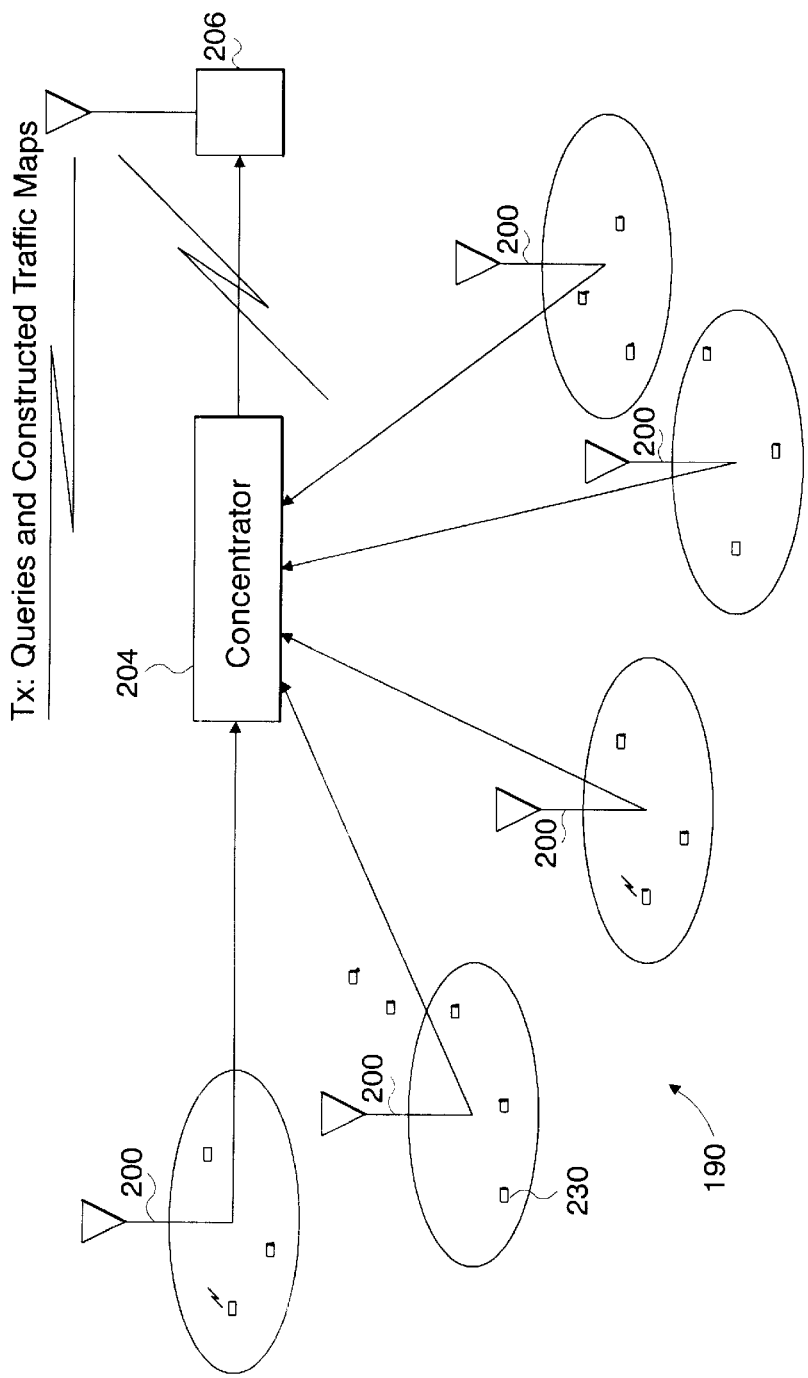
FIG. 13 shows a system for acquiring mapping information, in accordance with a preferred embodiment of the invention.

An alternative system 190 of this type, in accordance with a preferred embodiment of the invention is shown in FIG. 13. In FIG. 13, a plurality of local area transceivers 200 receive information from vehicles in regions surrounding transceivers 200. This information is preferably transferred to a concentrator 204 which receives information from a number of transceivers 200 and relays the information to a central station 206. Central station 206 then rebroadcasts the information (either as raw information or as maps or utilizing any other suitable format) to all the vehicles. Central station 206 can also be used to generate the queries as well and then to broadcast multiplexed data containing queries and constructed traffic maps. When the queries and results are received by all receivers, they can utilized the latest broadcast results together with the stored (previous) queries to produce accurate maps, by the methods described above.

In a preferred embodiment of the invention, vehicles are queried to transmit information as to which of a select number of troublesome intersections (including intersections already congested) that they expect to enter and when they expect to enter them. This information is preferably transmitted (in accordance with a query) in slots assigned to the intersections and estimated time intervals of arrival. Since more than one vehicle may expect to enter an intersection during a time interval represented by a given slot, in a preferred embodiment of the invention, a plurality of slots are assigned to each time interval and the number of vehicles is estimated from the number and percentage of slots in which a signal is received, using statistical estimates, based on each vehicle, which complies with the response criteria, responding randomly in one of the plurality of slots assigned to a time interval.

Additionally or alternatively, the future development of existing slowdowns can be estimated from the prior development of the slowdowns, the rate of change of the length of the slowdown and the average speed of the vehicles that are within the slowdown. Such information can be made available to the vehicles based on comparison of the development of slowdowns which are detected by the methods described above. Such a method helps to construct a time developing map of intersections sensitive to traffic jams (trouble spots).

Based on the estimates of the numbers of arrivals and times of arrival of the vehicles at the trouble spots, statistical information on future expected traffic jams is generated by the central station. However, in order to update the vehicles with real time expected traffic jams, the system has to perform periodic checks on trouble spots and to update vehicles with validated predictions of traffic jams, so they will recalculate their individual routings. This estimate of times of arrival may be based on a query based system, as described above, in which the queries request information on the expected arrival time of the vehicles at various intersections, including at least those which are already congested.

This recalculation of routes, broadcast of times of arrival at trouble spots and estimations of future traffic jams and slowdowns provides an adaptive refreshed process that uses current and predicted information, that gives each vehicle the information required to make a distributed route calculation system effective in avoiding future problems, without the huge bandwidth requirements of central calculation of routes for the vehicles.

A continuous process that updates the vehicles with information regarding current and predicted traffic jams, could be used with a distributed Dynamic Route Guidance (DRG) system which dynamically selects the preferred routes. Such a DRG process performed, in the vehicle, should preferably help to alleviate congested roads in a synchronized way wherein different vehicles synchronize their processes of DRG. Synchronization is preferred to avoid too many vehicles taking the same route, causing congestion there. With such a method an a posteriori correction of try and fail processes can be used. This means that when vehicles receive predicted information about numbers of vehicles that are expected to pass a road or intersection in a given time, some of them should choose a "less preferred" alternative. This alternative may increase their travel time or distance by some factor; however, the overall result may be that traffic jams do not result or are less severe. If, on a second check of the predicted traffic, the jam still occurs, even less preferred alternative (i.e., ones that take even longer) are used by some of the vehicles, at least until travel time is equalized among the vehicles.

Figure 14:
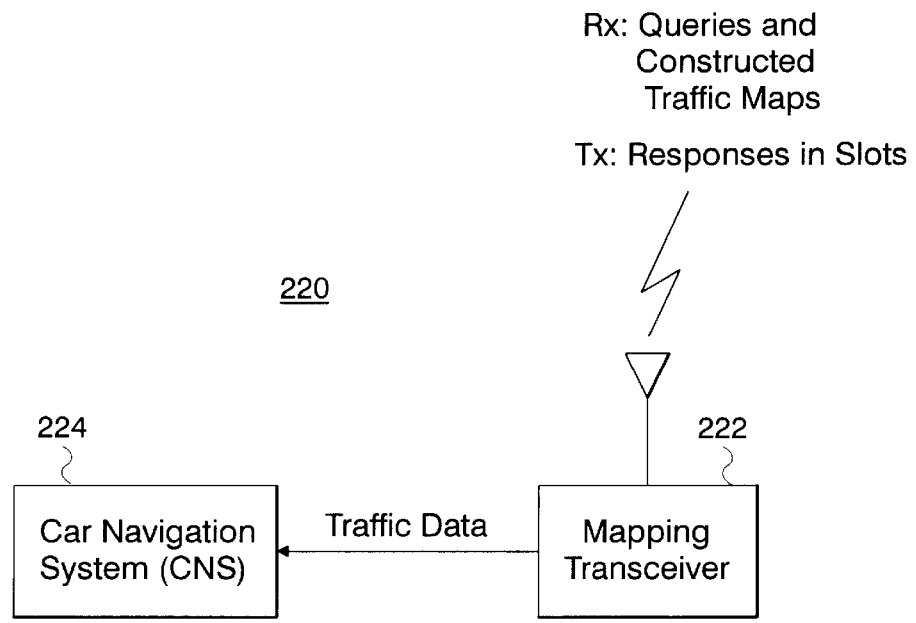
FIGS. 14 and 15 are schematic block diagrams of traffic jam mapping systems in accordance with preferred embodiments of the invention, as interfaced with a car navigation system.
Figure 15:
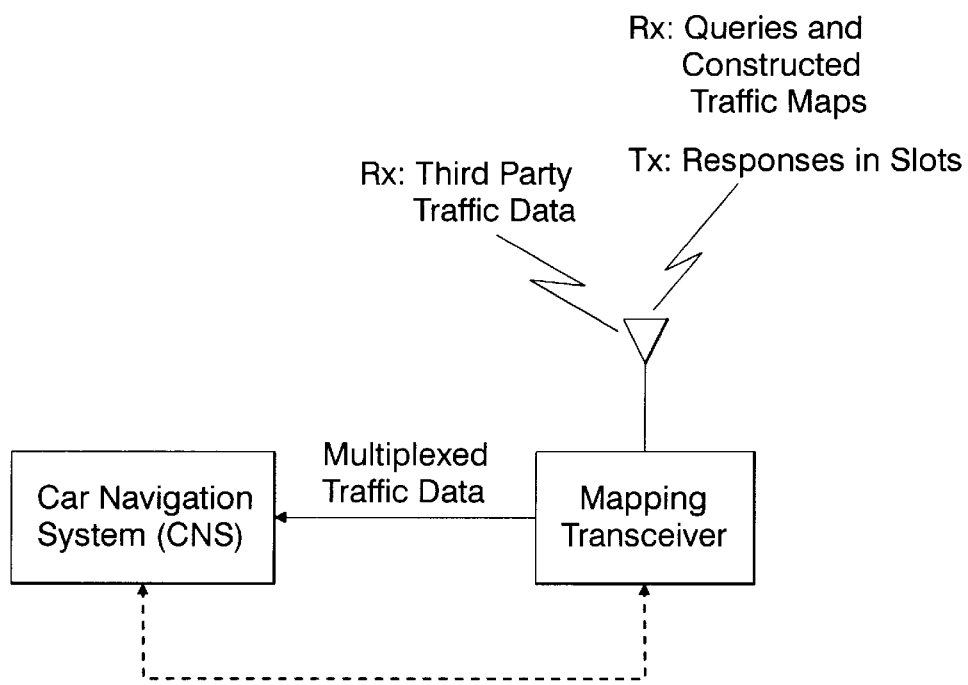

FIGS. 14 and 15 show two systems for connecting the mapping information, into car navigation systems (CNS) in accordance with preferred embodiments of the invention.

FIG. 14 shows a simple system 220 in a vehicle in which an intelligent mapping transceiver 222 receives queries and slot allocations and sends position and/or other information in respective slots. Mapping system 222 sends traffic information to CNS system 224 via a standard interface, such as Japan's VICS interface, or the European RDS standard or other information interface formats.

FIG. 15 shows a more sophisticated system in which the CNS may provide computation facilities and/or data and/or timing to the mapping transceivers, for example GPS positioning information (which the mapping transceiver uses to determine its position), GPS timing (which may be used as the master timing for the mapping system, with the slots being timed from a GPS timing signal which is common to all the vehicles and base stations), dead reckoning positioning information (to improve the accuracy of the positions being reported) and/or map related information (so that the mapping system may provide traffic maps for the CNS). In addition, the mapping transceivers may receive and relay to the CNS traffic information from other sources which it may combine with its own traffic information before sending to the CNS. Alternatively, GPS information may be determined from an internal GPS receiver in the mapping transceiver (for example, 222 in FIG. 14), or from an external source (e.g. CNS provided data).

Information may be sent by the control center to the vehicles to enable them to minimize average travel delays, for example, by using distributed DRG. This information may consist of the above mentioned maps or maps of travel delay information at various intersections. The vehicles can then use this information to optimize their route. Alternatively, current and predicted maps may be used by the control center to send routing information to some of the vehicles in order to equalize traffic delays. In either event, the fast response of the mapping system allows for real time supervision, adjustment and continuous stabilization of traffic patterns with additional iterations. As described above, in a distributed system only prospective traffic patterns are broadcast by the control center and each vehicle calculates its own route.

Figure 19:
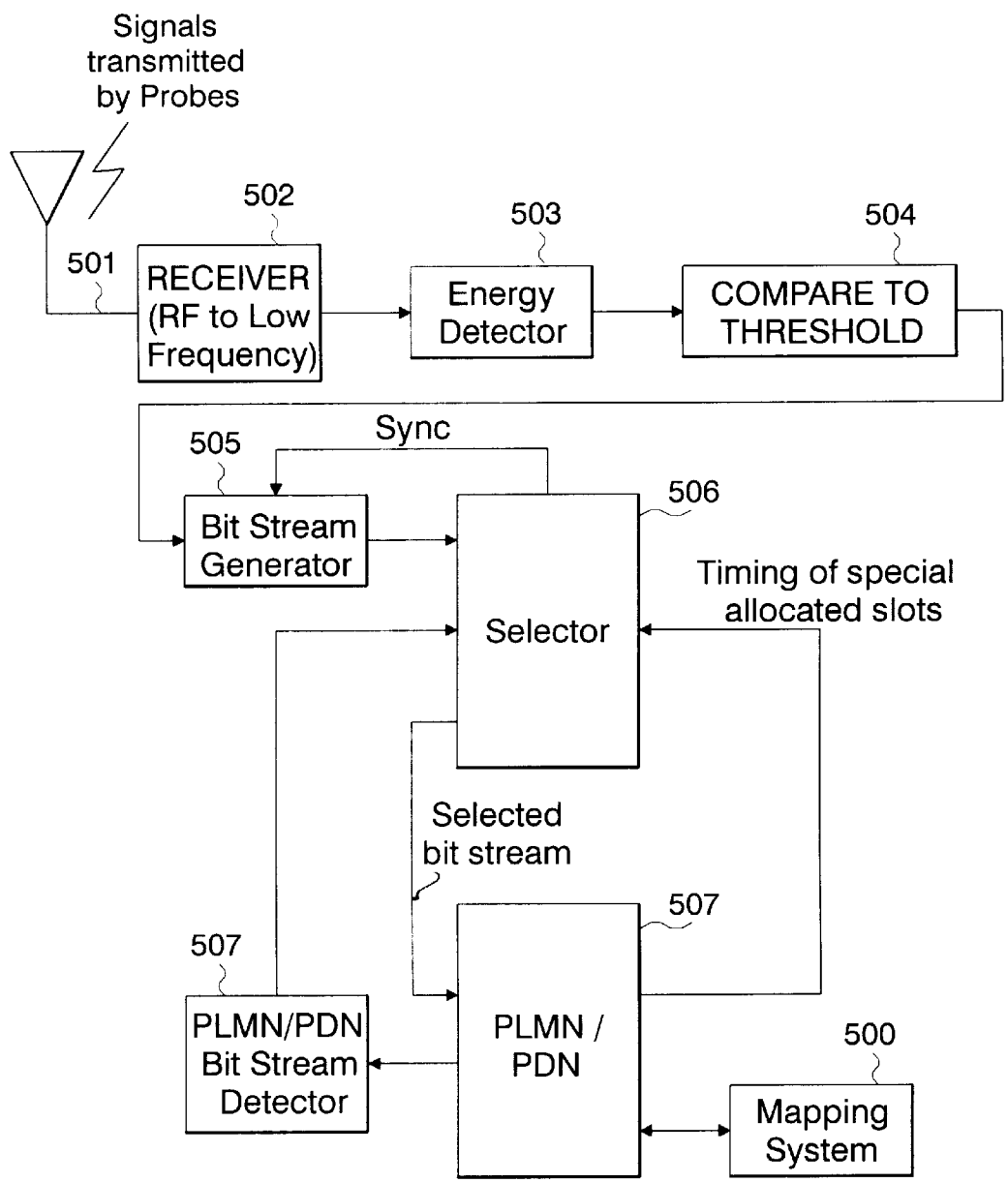
FIG. 19 illustrates an approach to detect signals transmitted by more than one probe in the same pre-designated time slot, with a modification to PLMN/PDN base station.

FIG. 19 shows an approach to detect signals that could be transmitted by more than one probe in the same pre-designated time slot. This implementation considers modification to PLMN/PDN base station. The output of the PLMN/PDN bit stream detector is changed to feed suggested selector that can also receive generated bit stream according to probe responses. The output of the selector is connected to the PLMN/PDN at the point where the output of the PLMN/PDN bit stream detector was connected before the change. When time slots are allocated to probe responses, a PLMN/PDN indication could be used to control the selector timing. Such control can use a receiver in the selector that identifies the timing as they are allocated to the mobile units of the probes. Such allocation can refer to slots of an allocated traffic channel preferably used on a random access enabled channel. Since energy detection is made to probe responses, an arbitrary sequence could be determined to indicate on detected energy. This generated bit stream should emulate a detected bit stream format for the PLMN/PDN that could be recognized by the mapping system processor that would be linked to the generated bit stream by the PLMN/PDN. This option would preferably be implemented with PLMN/PDN based on TDMA systems. The mapping system could either be connected directly to the PLMN/PDN, or through another system, such as a PSTN. The system for implementing PLMN may also be partly internal.

Figure 20:
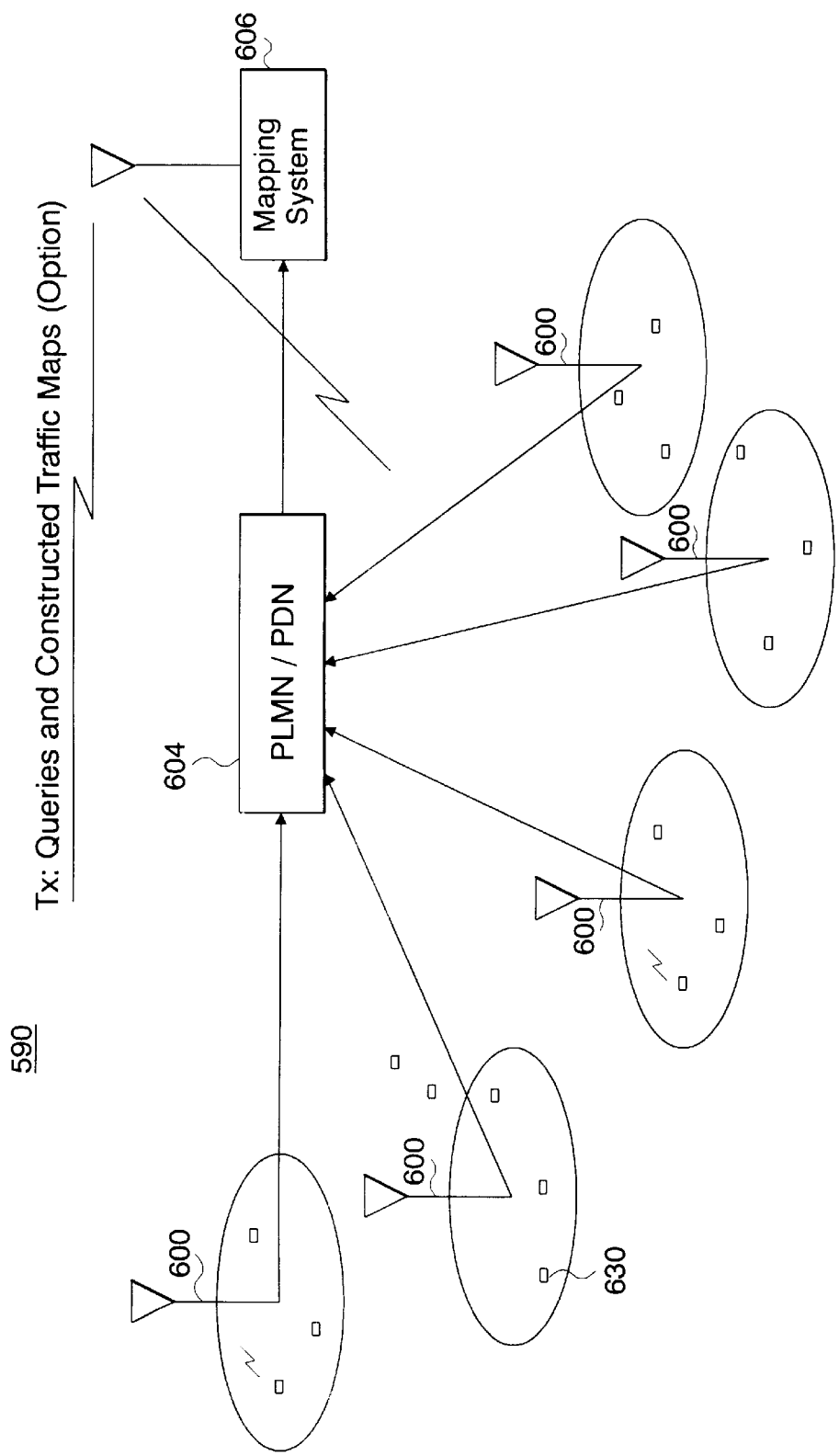
FIG. 20 shows the system configuration where the mapping system performs the control on the probe responses and receives the probe responses through the PLMN/PDN.

FIG. 20 shows the system configuration where the mapping system performs the control on the probe responses and receives the probe responses through the PLMN/PDN. The control messages to the probes, can either use broadcast channels or paging channels of the PLMN/PDN. Another possibility to provide messages to the probes is to use a paging system or, RDS-TMC broadcast channel, for example, wherein the messages could be multiplexed with the traffic information provided to traveler information systems. The mapping system could either be connected directly to the PLMN/PDN, or through another system, such as a PSTN.

Figure 21:
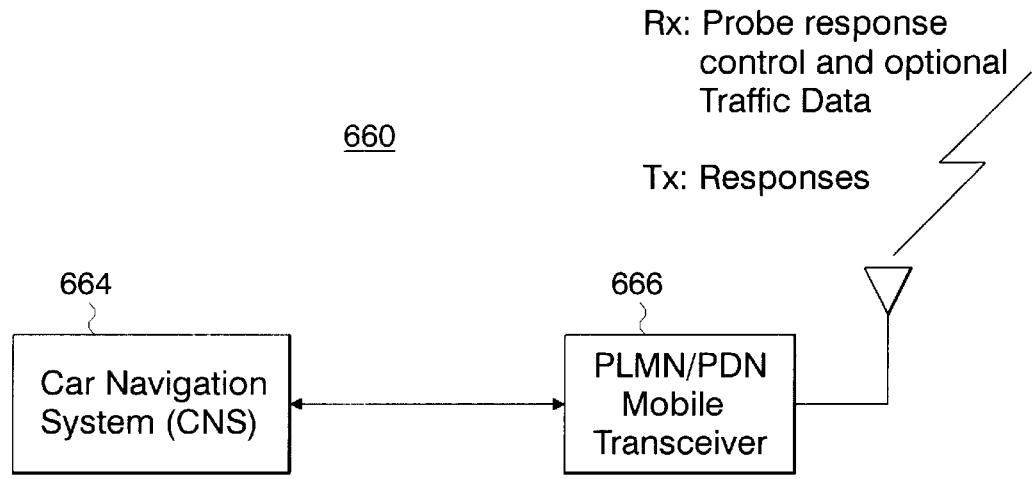
FIG. 21 shows the implementation of a probe system wherein the probe processing unit is based on a car navigation system and the probe communication unit is based on a PLMN/PDN mobile unit for two way communication with the mapping system.

FIG. 21 shows the implementation of a probe system wherein the probe processing unit is based on a car navigation system and the probe communication unit is based on a PLMN/PDN mobile unit for two way communication with the mapping system. When this system is used for implementing the first option, the transmission time will refer to the allocated special channel (slots). With implementation of the first option, as shown in FIG. 19, the content of the transmitted signal from the probe could be an arbitrary message. With implementation of the second option, the content of the transmitted messages will use predetermined protocol between the probe and the mapping system and, the communication link between the mobile unit and the PLMN/PDN will use respective standard protocol of the used PLMN/PDN. Implementation of the second option would be most efficient when short data packet can be used with the PLMN/PDN for probe messages to the mapping system, e.g., as planned to be part of CDMA-PLMN. The reports and processing capabilities of the probe system will comply with the probe functions, probe responses and response control from the mapping system, in accordance with the functions required for implementation of either the first option or implementation of the second option.

Figure 22:
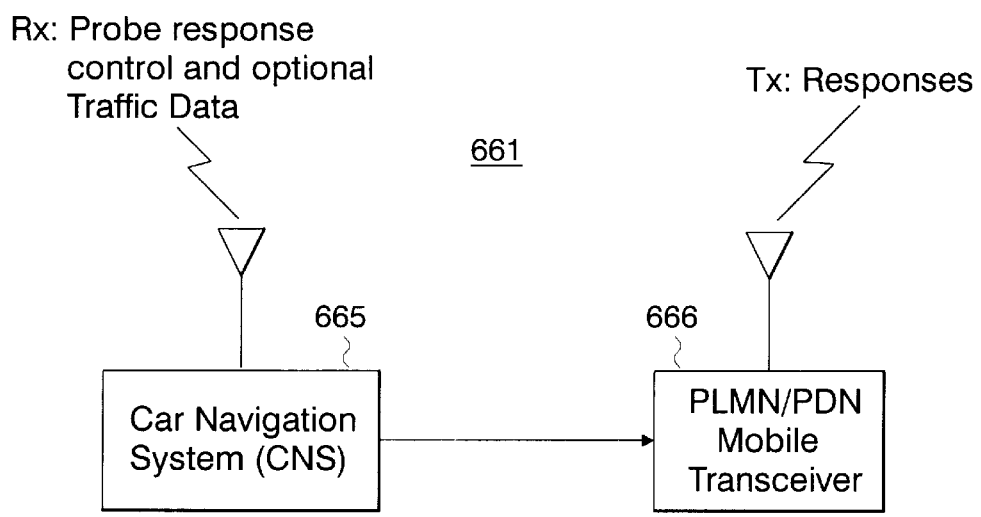
FIG. 22 illustrates a similar implementation to that of FIG. 21 wherein the control on the responses from probes is provided by a broadcast channel such as RDS-TMC or any other type of paging system.

FIG. 22 is a similar implementation to that of FIG. 21 wherein the control on the responses from probes is provided by a broadcast channel such as RDS-TMC or any other type of paging system.

Figure 23:
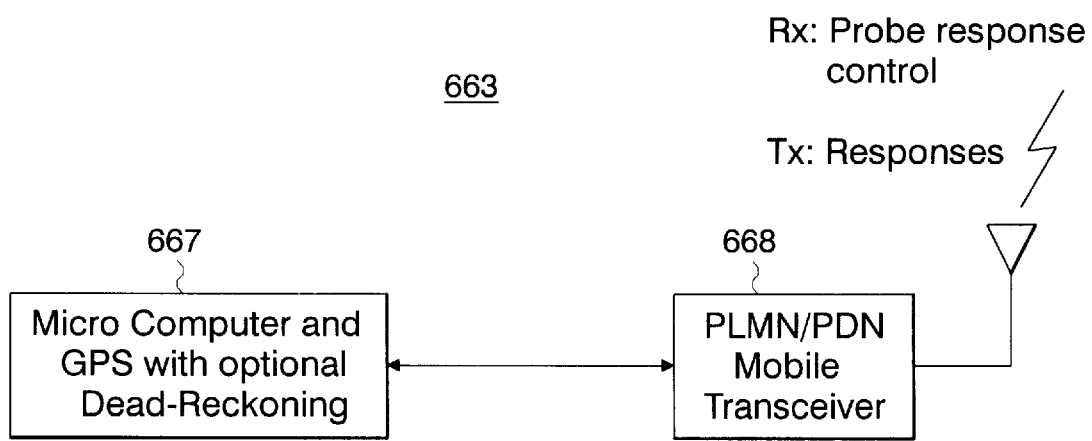
FIG. 23 illustrates similar implementation such as shown in FIG. 21 wherein the positioning and processing unit is a simple one that enables probe response according to GPS and preferably by complementary dead reckoning positioning or any other stored data without a road map.

FIG. 23 shows similar implementation such as shown in FIG. 21 wherein the positioning and processing unit is a simple one that enables probe response according to GPS and preferably by complementary dead reckoning positioning without a road map. Optionally, the processing unit will be used to store continuously positions and auxiliary information such as time, for later report in enabled/required time, and to enable storage of other data such as planned route or special points along the route, for example, points that would help the probe to determine its direction related to a specific place where it has to take a turn. This would help to determine the respective queue, where the probe belongs. This could further help the mapping to refer to directions with mapping samples. The processing unit can also be connected to a paging receiver to get mapping system messages instead of using the PLMN/PDN channels.

In many of the above embodiments of the invention, the system is triggered and/or synchronized according to a synch signal broadcast by a control station. Other sources of synchronization, which synchronize both the remote and control station, such as GPS received signals or other timing signals, can be used to trigger and/or help synchronize the system.

The invention has been described herein using examples in which the indication signals are transmitted in time, frequency or time and frequency slots. Other types of transmission slots are also useful in the invention such as frequency hopping and other spread-spectrum transmission slots. The term "transmission slots" or "slots" as used herein includes all these types of slots. In addition, while the invention has been described in a preferred embodiment thereof in which the positions of the probes are determined using the preferred query/slot response method described above, in other preferred embodiments of the invention, the actual reporting function may utilize other data transmission methods, such as Aloha, slotted Aloha or other methods known in the art. In such transmission methods, the distance from a focus, for example, is determined based on data specifying distance from the focus. Such methods may be useful when the percentage of probe vehicles is relatively low, e.g., not more than about 5 percent.

The terms "comprise" "have" and "include" or their conjugates, where used herein, mean "including, but not necessarily limited to."

What is claimed is:

1. A method of determining an indication of length of a queue of vehicles on a road, using probe reports, transmitted according to a predetermined protocol, associated with the probe reports, to a mapping system which processes the probe reports, wherein a report includes a characteristic value of position of the probe, the method comprising:

(a) constructing with the mapping system a plurality of mapping samples, (b) determining for each of the plurality of mapping samples a position that relates to the farthest probe position from a mapping focus;

(c) choosing from the position determined in (b) the position which is the farthest from the mapping focus for determining an indication on length of the queue; and wherein the process of gathering position related updates from probes, associated with the construction of mapping samples, is being made through a dedicated radio channel in which probes transmit signals in pre-assigned slots in accordance with their position and other criteria, determined by a pre determined protocol.

2. A method of determining length of a queue of vehicles on a road and traffic motion in the queue, wherein according to a predetermined protocol of probe reports characteristic values of the position of the probes to a receiver of mapping system which processes the reports, the method comprising:

(a) constructing at least one mapping sample that includes at least one of the reports, (b) determining a range of the position characteristic values in which the farthest reporter from mapping focus was identified in the mapping sample constructed in (a);

(c) transmitting to reporters a response that according to a predetermined procedure disables transmitters that did not transmit a report within the chosen range from continuing to report;

(d) receiving further reports and constructing a subsequent mapping sample;
(e) repeating steps (a) to (d) according to a predetermined procedure;
(f) choosing from the determined ranges in (b) the farthest chosen range to be indicative of the length of the queue;
(g) determining motion length toward a mapping focus by calculating a range characteristic value for a range in a mapping sample, subsequent to the first mapping sample, which includes the position characteristic value indicative of the closest position to the mapping focus and calculating the difference between the said range characteristic value and the range characteristic value of a corresponding chosen range in an earlier mapping sample; and
wherein the process of gathering position related updates from probes, associated with the construction of mapping samples, is being made through a dedicated radio channel in which probes transmit signals in pre-assigned slots in accordance with their position and other criteria, determined by a pre determined protocol.

3. A method of creating conditions which enable assessment of traffic motion rate in a queue of vehicles and enables to construct reference positions for further concatenation of non overlapped segments of mapping sample to further enable more accurate statistical estimates, including either or both average arrival rate of vehicles to the queue and percentage of probes in the queue, wherein according to a predetermined protocol probes report characteristic values of their position to a mapping system which receives and processes the reports, the method comprising:
(a) constructing a first mapping sample that includes at least one of said reports,
(b) determining a range of said position characteristic values in which at least one of said reports was identified in the first mapping sample,
(c) transmitting to reporters a response that according to a predetermined procedure disables transmitters that did not transmit a report within the chosen range of the first mapping sample from continuing to report; and
wherein the process of gathering position related updates from probes, associated with the construction of mapping samples, is being made through a dedicated radio channel in which probes transmit signals in pre-assigned slots in accordance with their position and other criteria, determined by a pre determined protocol.

4. A method of determining an indication of length of a queue of vehicles on a road, using probe reports of probes transmitted according to a predetermined protocol, associated with the probe reports, to a mapping system which processes the probe reports, wherein a report includes a characteristic value of position of the probe, the method comprising:
(a) constructing with the mapping system a plurality of mapping samples,
(b) determining for each of the plurality of mapping samples a position that relates to the farthest probe position from a mapping focus;
(c) choosing from the position determined in (b) the position which is the farthest from the mapping focus for determining an indication on length of the queue;
wherein the process of gathering position related updates from probes, associated with the construction of mapping samples, is being made through a PLMN or a PDN, which allocates radio communication resources to pre-assigned slots, according to a predetermined protocol associated with the PLMN or PDN.

5. A method of determining length of a queue of vehicles on a road and traffic motion in the queue, wherein according to a predetermined protocol probes report characteristic values of the position of the probes to a receiver of mapping system which processes the reports, the method comprising:
(a) constructing at least one mapping sample that includes at least one of the reports,
(b) determining a range of the position characteristic values in which the farthest reporter from mapping focus was identified in the mapping sample constructed in (a);
(c) transmitting to reporters a response that according to a predetermined procedure disables transmitters that did not transmit a report within the chosen range from continuing to report;
(d) receiving further reports and constructing a subsequent mapping sample;
(e) repeating steps (a) to (d) according to a predetermined procedure;
(f) choosing from the determined ranges in (b) the farthest chosen range to be indicative of the length of the queue;
(g) determining motion length toward a mapping focus by calculating a range characteristic value for a range in a mapping sample, subsequent to the first mapping sample, which includes the position characteristic value indicative of the closest position to the mapping focus and calculating the difference between the said range characteristic value and the range characteristic value of a corresponding chosen range in an earlier mapping sample;
wherein the process of gathering position related updates from probes, associated with the construction of mapping samples, is being made through a PLMN or a PDN, which allocates radio communication resources to pre-assigned slots, according to a predetermined protocol associated with the PLMN or PDN.

6. A method of creating conditions which enable assessment of traffic motion rate in a queue of vehicles and enables to construct reference positions for further concatenation of non overlapped segments of mapping sample to further enable more accurate statistical estimates, including either or both average arrival rate of vehicles to the queue and percentage of probes in the queue, wherein according to a predetermined protocol probes report characteristic values of their position to a mapping system which receives and processes the reports, the method comprising:
(a) constructing a first mapping sample that includes at least one of said reports,
(b) determining a range of said position characteristic values in which at least one of said reports was identified in the first mapping sample,
(c) transmitting to reporters a response that according to a predetermined procedure disables transmitters that did not transmit a report within the chosen range of the first mapping sample from continuing to report;
wherein the process of gathering position related updates from probes, associated with the construction of mapping samples, is being made through a PLMN or a PDN, which allocates radio communication resources to pre-assigned slots, according to a predetermined protocol associated with the PLMN or PDN.

7. The method according to claim 4, wherein the PLMN or PDN is equipped with a unit in a base station that detects received signals in pre-assigned slots and according to a predetermined protocol converts the information associated with the detection to a respective bit stream which is further transmitted to a mapping processor as a data message.

8. The method according to claim 5, wherein the PLMN or PDN is equipped with a unit in a base station that detects received signals in pre-assigned slots and according to a predetermined protocol converts the information associated with the detection to a respective bit stream which is further transmitted to a mapping processor as a data message.

9. The method according to claim 6, wherein the PLMN or PDN is equipped with a unit in a base station that detects received signals in pre-assigned slots and according to a predetermined protocol converts the information associated with the detection to a respective bit stream which is further transmitted to a mapping processor as a data message.

10. A method of determining an indication of length of a queue of vehicles on a road, using probe reports of probes transmitted according to a predetermined protocol, associated with the probe reports, to a mapping system which processes the probe reports, wherein a report includes a characteristic value of position of the probe, the method comprising:

(a) constructing with the mapping system a plurality of mapping samples, (b) determining for each of the plurality of mapping samples a position that relates to the farthest probe position from a mapping focus;

(c) choosing from the position determined in (b) the position which is the farthest from the mapping focus for determining an indication on length of the queue; and wherein the process of gathering position related updates from probes, associated with the construction of mapping samples, is being made through a PLMN or PDN and wherein the position related updates are data messages transmitted by probes according to a data communication protocol associated with the radio communication medium and wherein a message includes the position related data and auxiliary data that enables to determine time associated with the position related update.

11. A method of determining length of a queue of vehicles on a road and traffic motion in the queue, wherein according to a predetermined protocol of probe reports characteristic values of the position of the probes to a receiver of mapping system which processes the reports, the method comprising:

(a) constructing at least one mapping sample that includes at least one of the reports, (b) determining a range of the position characteristic values in which the farthest reporter from mapping focus was identified in the mapping sample constructed in (a);

(c) transmitting to reporters a response that according to a predetermined procedure disables transmitters that did not transmit a report within the chosen range from continuing to report;

(d) receiving further reports and constructing a subsequent mapping sample;

(e) repeating steps (a) to (d) according to a predetermined procedure;

(f) choosing from the determined ranges in (b) the farthest chosen range to be indicative of the length of the queue;

(g) determining motion length toward a mapping focus by calculating a range characteristic value for a range in a mapping sample, subsequent to the first mapping sample, which includes the position characteristic value indicative of the closest position to the mapping focus and calculating the difference between the said range characteristic value and the range characteristic value of a corresponding chosen range in an earlier mapping sample; and wherein the process of gathering position related updates from probes, associated with the construction of mapping samples, is being made through a PLMN or PDN and wherein the position related updates are data messages transmitted by probes according to a data communication protocol associated with the radio communication medium and wherein a message includes the position related data and auxiliary data that enables to determine time associated with the position related update.

12. A method of creating conditions which enable assessment of traffic motion rate in a queue of vehicles and enables to construct reference positions for further concatenation of non overlapped segments of mapping sample to further enable more accurate statistical estimates, including either or both average arrival rate of vehicles to the queue and percentage of probes in the queue, wherein according to a predetermined protocol probes report characteristic values of their position to a mapping system which receives and processes the reports, the method comprising:

(a) constructing a first mapping sample that includes at least one of said reports, (b) determining a range of said position characteristic values in which at least one of said reports was identified in the first mapping sample, (c) transmitting to reporters a response that according to a predetermined procedure disables transmitters that did not transmit a report within the chosen range of the first mapping sample from continuing to report; and wherein the process of gathering position related updates from probes, associated with the construction of mapping samples, is being made through a PLMN or PDN and wherein the position related updates are data messages transmitted by probes according to a data communication protocol associated with the radio communication medium and wherein a message includes the position related data and auxiliary data that enables to determine time associated with the position related update.

13. A method of determining an indication of average length, over a time period, of a queue of vehicles on a road, using probe reports of probes transmitted according to a predetermined protocol, associated with the probe reports, to a mapping system which processes the probe reports, wherein a report includes a characteristic value of position of the probe, the method comprising:

(a) constructing with the mapping system a plurality of mapping samples, (b) determining for each of the plurality of mapping samples a position that relates to the farthest probe position from a mapping focus;

(c) choosing from the position determined in (b) the position which is the farthest from the mapping focus for determining an indication on length of the queue; and wherein according to a predetermined procedure the mapping system estimates the percentage of probes among arrived vehicles to the queue, by predicting the number of probes that plan to arrive to a mapped queue in a forward time interval using a counting method for determining the percentage of probes based on the proportion between the slots in which energy was detected as a result of at least one probe transmission and the number of allocated slots.

\* \* \* \* \*

UNITED STATES PATENT AND TRADEMARK OFFICE
CERTIFICATE OF CORRECTION

PATENT NO. : 6,542,808 B2
DATED : April 1, 2003
INVENTOR(S) : Josef Mintz

It is certified that error appears in the above-identified patent and that said Letters Patent is hereby corrected as shown below:

<u>Title page,</u>
Item [63], should read:

-- [63] Continuation-in-part of application No. 09/945,257, filed on Aug. 31, 2001, which is a continuation of application No. PCT/IB00/00239, filed on Mar. 8, 2000. --

Signed and Sealed this

Twelfth Day of August, 2003

JAMES E. ROGAN
*Director of the United States Patent and Trademark Office*